US010295897B2

(12) United States Patent
Nagai et al.

(10) Patent No.: US 10,295,897 B2
(45) Date of Patent: May 21, 2019

(54) TRANSPARENT SCREEN

(71) Applicant: FUJIFILM Corporation, Tokyo (JP)

(72) Inventors: Michio Nagai, Kanagawa (JP); Yoji Ito, Kanagawa (JP); Akira Yamamoto, Kanagawa (JP); Yukito Saitoh, Kanagawa (JP); Yujiro Yanai, Kanagawa (JP); Daisuke Kashiwagi, Kanagawa (JP); Nobuhiko Ichihara, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/678,498

(22) Filed: Aug. 16, 2017

(65) Prior Publication Data

US 2017/0343830 A1 Nov. 30, 2017

Related U.S. Application Data

(63) Continuation of application No. PCT/JP2016/055073, filed on Feb. 22, 2016.

(30) Foreign Application Priority Data

Feb. 20, 2015 (JP) ................................ 2015-032032
Dec. 4, 2015 (JP) ................................ 2015-237889

(51) Int. Cl.
*G03B 21/56* (2006.01)
*G02B 5/30* (2006.01)
(Continued)

(52) U.S. Cl.
CPC .......... *G03B 21/60* (2013.01); *G02B 5/0215* (2013.01); *G02B 5/0236* (2013.01);
(Continued)

(58) Field of Classification Search
CPC ................................................ G02B 27/288
(Continued)

(56) References Cited

U.S. PATENT DOCUMENTS 8,134,660 B2 3/2012 Umeya et al.
2002/0085368 A1* 7/2002 Taniguchi ............ G02B 6/0036 362/601

(Continued)

FOREIGN PATENT DOCUMENTS

JP 2006-337944 A 12/2006
JP 2008-250541 A 10/2008

(Continued)

OTHER PUBLICATIONS

International Search Report issued in PCT/JP2016/055073 dated May 10, 2016.

(Continued)

*Primary Examiner* — Christopher E Mahoney
(74) *Attorney, Agent, or Firm* — Edwards Neils, LLC; Jean C. Edwards, Esq.

(57) ABSTRACT

A transparent screen includes a substrate capable of transmitting light; and a plurality of dots formed on a surface of the substrate, each of the dots having wavelength-selective reflectivity and being formed of a liquid crystal material having a cholesteric structure, in which the cholesteric structure gives a striped pattern of bright parts and dark parts in a cross-sectional view of the dot observed by scanning electron microscope, the dot includes a portion having a height that increases continuously to the maximum height in a direction extending from the edge toward the center of the dot, and in the portion, the angle formed by the normal line to a line that is formed by a first one of the dark parts as counted from the surface of the dot on the opposite side of the substrate and the surface of the dot is in the range of 70° to 90°.

20 Claims, 9 Drawing Sheets

(51) Int. Cl.

| | |
|---|---|
| ***G03B 21/60*** | (2014.01) |
| ***G02B 27/28*** | (2006.01) |
| ***G02B 5/02*** | (2006.01) |
| ***G02B 5/20*** | (2006.01) |
| ***G02B 27/26*** | (2006.01) |
| ***G03B 21/62*** | (2014.01) |

(52) U.S. Cl.
CPC ........... *G02B 5/0284* (2013.01); *G02B 5/201* (2013.01); *G02B 5/3016* (2013.01); *G02B 27/26* (2013.01); *G02B 27/288* (2013.01); *G03B 21/567* (2013.01); *G03B 21/62* (2013.01)

(58) Field of Classification Search
USPC .................................................. 359/449, 459
See application file for complete search history.

(56) References Cited

U.S. PATENT DOCUMENTS

| | | | | |
|---|---|---|---|---|
| 2008/0182041 | A1* | 7/2008 | Sekine | G02B 5/3016 428/29 |
| 2008/0233360 | A1* | 9/2008 | Sekine | B32B 38/145 428/195.1 |
| 2009/0015548 | A1 | 1/2009 | Tazaki et al. | |
| 2010/0078642 | A1* | 4/2010 | Tano | H01L 51/0004 257/59 |
| 2010/0283774 | A1* | 11/2010 | Bovet | G02B 27/017 345/211 |
| 2014/0246632 | A1* | 9/2014 | Nakanishi | C09B 31/08 252/585 |
| 2014/0307176 | A1* | 10/2014 | Neumann | G02B 27/0149 349/11 |
| 2016/0245968 | A1* | 8/2016 | Ichihara | G02B 5/26 |
| 2018/0052264 | A1* | 2/2018 | Saitoh | G02B 5/26 |

FOREIGN PATENT DOCUMENTS

| | | | |
|---|---|---|---|
| JP | 2008-269545 | A | 11/2008 |
| JP | 2009-008932 | A | 1/2009 |
| JP | 2010-085532 | A | 4/2010 |
| JP | 2014-071250 | A | 4/2014 |
| WO | 2007/105721 | A1 | 9/2007 |

OTHER PUBLICATIONS

Written Opinion issued in PCT/JP2016/055073 dated May 10, 2016.
International Preliminary Report on Patentability issued by WIPO dated Aug. 31, 2017, in connection with International Patent Application No. PCT/JP2016/055073.
Notification of Reasons for Refusal issued by the Japanese Patent Office (JPO) dated Jul. 10, 2018, in connection with Japanese Patent Application No. 2017-500773.

* cited by examiner

TRANSPARENT SCREEN

CROSS-REFERENCE TO RELATED APPLICATIONS

This application is a Continuation of PCT International Application No. PCT/JP2016/055073 filed on Feb. 22, 2016, which was published under PCT Article 21(2) in Japanese, and which claims priority under 35 U.S.C. § 119(a) to Japanese Patent Application No. 2015-032032 filed on Feb. 20, 2015 and Japanese Patent Application No. 2015-237889 filed on Dec. 4, 2015. The above applications are hereby expressly incorporated by reference, in their entirety, into the present application.

BACKGROUND OF THE INVENTION

1. Field of the Invention

The present invention relates to a transparent screen.

2. Description of the Related Art

In recent years, transparent screens in which light from the front surface side is reflected and light from the back surface side is transmitted, have been proposed as one of display devices.

For example, JP2006-337944A describes a semi-transmissive type reflective screen including a base material layer that is capable of transmitting light and is formed into an approximately flat parallel plate; a plurality of unit shapes capable of transmitting light, which protrudes on the back surface side of the base material layer, which is an opposite side of the video source side, and are one-dimensionally or two-dimensionally arrayed in a row along a screen surface; and a reflective layer that is provided at the apex of the back surface side of the unit shapes and reflects the video light that has been transmitted through the unit shapes, in which the unit shapes are arranged with gaps therebetween, and in the space between the unit shapes are arranged, a background transmission unit is provided in a state of being exposed to the base material layer or a flat surface parallel to the base material layer. This semi-transmissive type reflective screen is a screen with which the background on the back surface side can be observed from the front, while the video light from the front is reflected by means of a reflective surface and is made observable.

SUMMARY OF THE INVENTION

Generally, reflective type screens can be classified into a diffusion type, a recursion type, and a mirror reflection type, depending on the reflection characteristics.

A diffusion type screen uniformly diffuses and reflects light that has hit the surface into all directions without deflection. Therefore, the overall brightness is not so high; however, the viewing angle can be made wider.

A recursion type screen reflects light in a direction in which the light has been projected. Therefore, the brightness obtainable when viewed from the vicinity of a light source can be made high.

A mirror reflection type screen reflects light such that the incident angle of light is equal to the reflected angle, in the same manner as in the case of light being reflected by a mirror. Therefore, the brightness obtainable when viewed at the position of a reflected angle with respect to the incident angle of light from a light source, can be made high.

Such a recursion type or mirror reflection type screen can have the brightness increased in a particular direction; however, since the brightness in other directions is lowered, the screen has a feature that the viewing angle is narrowed.

Here, in regard to a transparent screen that reflects light from the front surface side and transmits light from the back surface side, it is requested to enhance the performance of transmitting light from the back surface, in addition to an enhancement in the reflection performance such as an increase in the brightness of projected light or an increase in the viewing angle.

However, when diffusibility is increased in a transparent screen in order to widen the viewing angle, there is a problem that the haze value increases, while transparency is lowered. On the contrary, when transparency is increased, since the reflection behaves more like mirror reflection, there is a problem that the viewing angle is narrowed.

In view of such circumstances, it is an object of the invention to provide a transparent screen having excellent transparency and an excellent viewing angle.

The inventors of the invention conducted a thorough investigation on the problems of the prior art technologies, and as a result, the inventors found that the problems can be solved by providing a transparent screen comprising a substrate capable of transmitting light; and a plurality of dots formed on a surface of the substrate, the dots having wavelength-selective reflectivity and being formed of a liquid crystal material having a cholesteric structure, in which the cholesteric structure gives a striped pattern of bright parts and dark parts in a cross-section of a dot observed by scanning electron microscope, each of the dots includes a portion having a height that increases continuously to the maximum height in a direction extending from the edge toward the center of the dot, and in the portion, the angle formed by the normal line to a line that is formed by a first one of the dark parts as counted from the surface of the dot on the opposite side of the substrate and the surface of the dot is in the range of 70° to 90°.

That is, the inventors found that the above-described object can be achieved by the following configurations.

(1) A transparent screen comprising: a substrate capable of transmitting light; and a plurality of dots formed on a surface of the substrate, each of the dots having wavelength-selective reflectivity and being formed of a liquid crystal material having a cholesteric structure, wherein the cholesteric structure gives a striped pattern of bright parts and dark parts in a cross-sectional view of the dot observed by scanning electron microscope, the dot includes a portion having a height that increases continuously to the maximum height in a direction extending from the edge toward the center of the dot, and in the portion, the angle formed by the normal line to a line that is formed by a first one of the dark parts as counted from the surface of the dot on the opposite side of the substrate and the surface of the dot is in the range of 70° to 90°.

(2) The transparent screen according to (1), further comprising an overcoat layer covering the dots on the surface of the substrate on the side where the dots have been formed, wherein the difference between the refractive index of the overcoat layer and the refractive index of the dots is 0.10 or less.

(3) The transparent screen according to (1) or (2), wherein the area ratio of the dots with respect to the substrate as viewed in the direction of the normal line to a principal surface of the substrate is 1.0% to 90.6%.

(4) The transparent screen according to any one of (1) to (3), wherein the plurality of dots include dots that reflect right-handed circularly polarized light and dots that reflect left-handed circularly polarized light.

(5) The transparent screen according to any one of (1) to (4), which includes dots each having, in a single dot, a region that reflects right-handed circularly polarized light and a region that reflects left-handed circularly polarized light.

(6) The transparent screen according to any one of (1) to (5), wherein the plurality of dots include two or more kinds of dots that reflect light in wavelength regions different from each other.

(7) The transparent screen according to any one of (1) to (6), which includes dots each having, in a single dot, two or more regions that reflect light in wavelength regions different from each other.

(8) The transparent screen according to any one of (1) to (7), wherein the contact angle between the dot and the substrate is 40° or larger.

(9) The transparent screen according to any one of (1) to (8), wherein the liquid crystal material is a material obtainable by curing a liquid crystal composition including a liquid crystal compound, a chiral agent, and a surfactant.

(10) The transparent screen according to any one of (1) to (9), wherein the haze value of the substrate is 0.1% to 30.0%.

According to the invention, a transparent screen having excellent transparency and an excellent viewing angle can be provided.

DESCRIPTION OF THE PREFERRED EMBODIMENTS

Figure 1A:
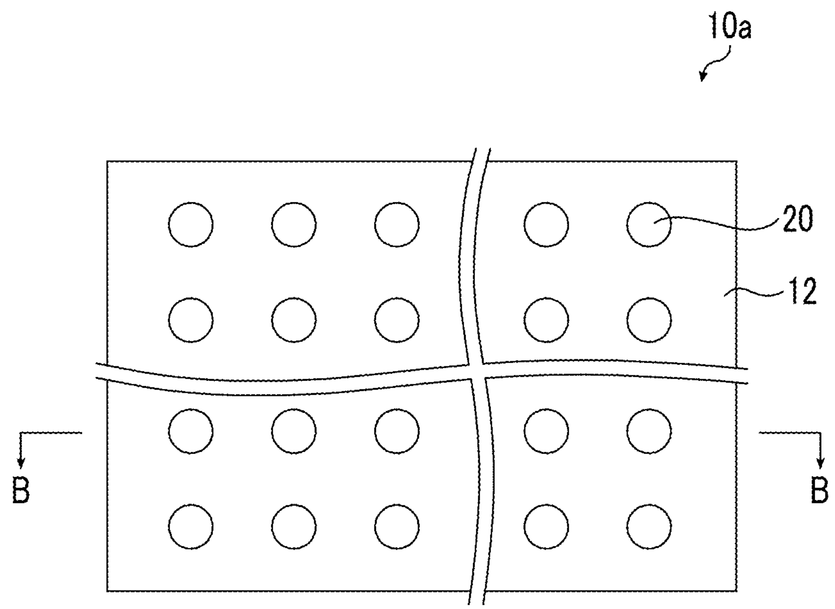
FIG. 1A is a front view conceptually illustrating an example of a transparent screen of the invention.

The transparent screen of the invention will be explained in detail below. A numerical value range represented by using "to" in the present specification means a range including the numerical values described before and after "to" as the lower limit and the upper limit, respectively.

According to the present specification, for example, an angle such as "45°", "parallel", "perpendicular" or "orthogonal" means that unless particularly stated otherwise, the difference between the angle and the exact angle is in the range of smaller than 5 degrees. The difference between the angle and the exact angle is preferably smaller than 4 degrees, and more preferably smaller than 3 degrees.

According to the present specification, the term "(meth) acrylate" is used to mean "any one or both of acrylate and methacrylate".

According to the present specification, the term "same" is meant to include an error range that is generally tolerable in the technical field. According to the present specification, when it is said "entirety", "all" or "entire surface", the terms are meant to include error ranges that are generally tolerable in the technical field, in addition to the case of being 100%, and to include the cases of, for example, 99% or more, 95% or more, or 90% or more.

Visible light is light having wavelengths that can be seen by human eyes among the electromagnetic waves and indicates light in the wavelength region of 380 nm to 780 nm. Non-visible light is light in the wavelength region of shorter than 380 nm or in the wavelength region of longer than 780 nm.

Without being limited to this, light in the wavelength region of 420 nm to 495 nm in the visible light is blue light, light in the wavelength region of 495 nm to 570 nm is green light, and light in the wavelength region of 620 nm to 750 nm is red light.

In the infrared light, near-infrared light is an electromagnetic wave in the wavelength region of 780 nm to 2,500 nm. Ultraviolet light is light in the wavelength region of 10 to 380 nm.

Recursive reflection according to the present specification means reflection by which incident light is reflected in the direction of incidence.

According to the present specification, the term "haze" means a value measured using a haze meter, NDH-2000, manufactured by Nippon Denshoku Industries Co., Ltd.

Theoretically, the haze means a value represented by the following expression.

(Diffuse transmittance of natural light at 380 to 780 nm)/(diffuse transmittance of natural light at 380 to 780 nm+direct transmittance of natural light)×100%

The diffuse transmittance is a value that can be calculated by subtracting the direct transmittance from the omnidirectional transmittance obtainable by using a spectrophotometer and an integrating sphere unit. The direct transmittance in the case based on the value measured using an integrating sphere unit is transmittance at 0°. That is, when it is said the haze is low, it implies that the amount of directly transmitted light in the total amount of transmitted light is large.

The term refractive index is the refractive index for light having a wavelength of 589.3 nm.

The transparent screen of the invention has a substrate capable of transmitting light; and a plurality of dots formed on the surface of the substrate, the dots having wavelength-selective reflectivity and being formed of a liquid crystal material having a cholesteric structure, in which the cholesteric structure gives a striped pattern of bright parts and dark parts in a cross-sectional view of a dot observed by scanning electron microscope, each of the dots includes a portion having a height that increases continuously to the maximum height in a direction extending from the edge toward the center of the dot, and in the portion, the angle formed by the normal line to a line that is formed by a first one of the dark parts as counted from the surface of the dot on the opposite side of the substrate and the surface of the dot is in the range of 70° to 90°.

As described above, for a transparent screen which reflects light from the front surface side and transmits light from the back surface side, it is requested to enhance the performance of transmitting light from the back surface, in addition to an enhancement in the reflection performance such as an increase in the brightness of projected light or an increase in diffusibility.

However, in regard to a transparent screen, when diffusibility is increased in order to widen the viewing angle, there is a problem that the haze value increases, and transparency is lowered. In contrast, when transparency is increased, since the reflection behaves more like mirror reflection, there is a problem that the viewing angle is narrowed.

In this regard, according to the invention, since light in a particular wavelength region can be reflected, and light in other wavelength regions can be transmitted by using a liquid crystal material having a cholesteric structure, a transparent screen which is capable of reflecting video light that is emitted from a video device such as a projector and enters the front surface, and transmitting light from the back surface, so that the video light and the background on the back surface side can be viewed in a superimposed manner, can be provided.

Here, when such a liquid crystal material having a cholesteric structure is formed into a flat layer, the mirror reflectivity is enhanced, and diffusibility for the incident video light is decreased. Therefore, the viewing angle is narrowed.

In this regard, according to the invention, a liquid crystal material having a cholesteric structure is formed into a plurality of dot-like bodies, this cholesteric structure of the dots give a striped pattern of bright parts and dark parts in a cross-sectional view of a dot observed by scanning electron microscope and includes a portion having a height that increases continuously to the maximum height in a direction extending from the edge toward the center of the dot, and in the portion, the angle formed by the normal line to a line that is formed by the first dark part as counted from the surface of the dot on the opposite side of the substrate and the surface of the dot is in the range of 70° to 90°. Therefore, light can be reflected in any direction in addition to mirror reflection, and the viewing angle can be widened without lowering transparency.

The transparent screen of the invention has a feature of having a low haze, that is, a high transmittance.

<Transparent Screen>

Suitable embodiments of the transparent screen of the invention will be explained below with reference to the drawings. FIG. 1A illustrates a front view of an example of the transparent screen of the invention, and FIG. 1B illustrates a cross-sectional view of FIG. 1A cut along the line B-B.

The diagrams presented for the invention are schematic diagrams, and the relations of the thicknesses of various layers, the positional relations, and the like do not necessarily coincide with the actual relations. The same also applies to the following diagrams.

Figure 1B:
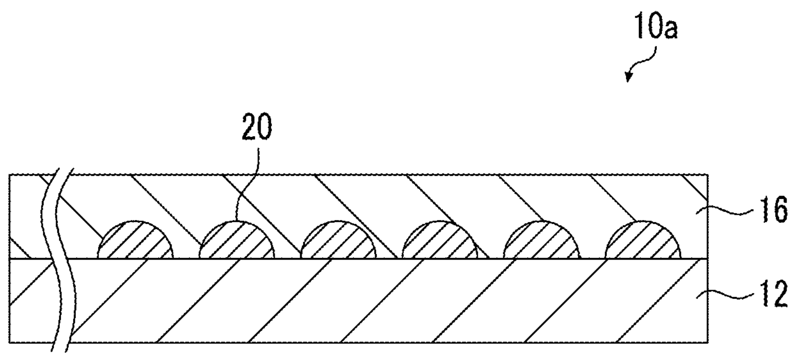
FIG. 1B is a cross-sectional view of FIG. 1A cut along the line B-B.

As illustrated in FIGS. 1A and 1B, a transparent screen 10*a* has a substrate 12 capable of transmitting light; a plurality of dots 20 formed on one principal surface of the substrate 12; and an overcoat layer 16 formed on the surface on the side where the dots 20 are formed, so as to embed the dots 20.

In FIG. 1A, the overcoat layer 16 is not shown in the diagram.

Video light enters through the surface on the side where the dots 20 are formed. That is, the surface on the side where the dots 20 are formed is a front surface, and the surface on the opposite side is a back surface.

As described above, since the dots 20 are formed of a liquid crystal material having a cholesteric structure having wavelength-selective reflectivity, the video light that enters through the surface of the transparent screen 10*a* on the side where the plurality of dots 20 are formed is reflected at the surface of a dot 20. However, since a dot 20 is formed into an approximately hemispheric shape, the incident angle of the incident video light changes correspondingly to the various positions on the surface of the dot 20. Accordingly, the video light is reflected in various directions, and an effect that the viewing angle is widened can be manifested.

Therefore, based on the wavelength region of the incident video light, the dots 20 have wavelength-selective reflectivity of selectively reflecting light in this wavelength region.

The cholesteric structure of the liquid crystal material that constitutes the dots 20 gives a striped pattern of bright parts and dark parts in a cross-sectional view of a dot observed by scanning electron microscope and includes a portion having a height that increases continuously to the maximum height in a direction extending from the edge toward the center of the dot, and in the portion, the angle formed by the normal line to a line that is formed by a first one of the dark parts as counted from the surface of the dot on the opposite side of the substrate and the surface of the dot is in the range of 70° to 90°.

More detailed explanation in this regard will be given later.

Figure 2:
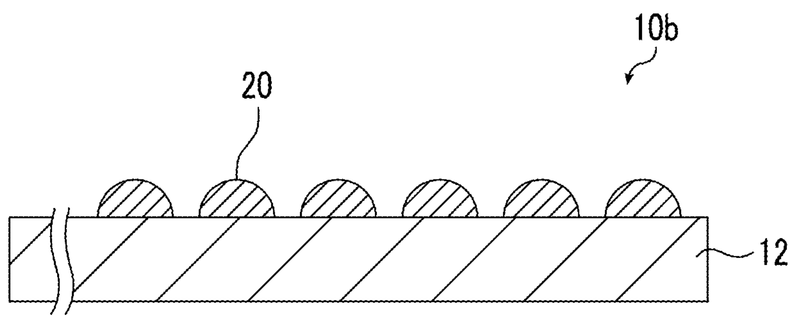
FIG. 2 is a schematic cross-sectional view of another example of the transparent screen of the invention.

Here, in regard to the transparent screen 10*a* illustrated in FIG. 1B, a preferred aspect thereof has an overcoat layer 16 that is formed so as to cover the dots 20. However, the invention is not intended to be limited to this, and a configuration in which the dots 20 are exposed without having the overcoat layer, as in the case of the transparent screen 10*b* illustrated in FIG. 2, is also acceptable.

According to the invention, when the transparent screen has an overcoat layer 16 as in the case of the transparent screen 10*a* illustrated in FIG. 1B, it is preferable from the viewpoint that transparency can be improved by eliminating surface unevenness caused by the plurality of dots 20.

Furthermore, in the case of forming the overcoat layer 16, from the viewpoint of further enhancing transparency by suppressing reflection at the interface between the overcoat layer 16 and the dots 20, it is preferable as the difference between the refractive index of the overcoat layer 16 and the refractive index of the dots 20 is smaller. The difference in the refractive index is preferably 0.10 or less, more preferably 0.04 or less, and particularly preferably 0.02 or less.

The plurality of dots 20 thus formed may be such that all of the dots 20 reflect light in the same wavelength region; however, the invention is not intended to be limited to this, and a configuration including two or more kinds of dots that reflect light in wavelength regions different from each other is also acceptable.

Figure 3:
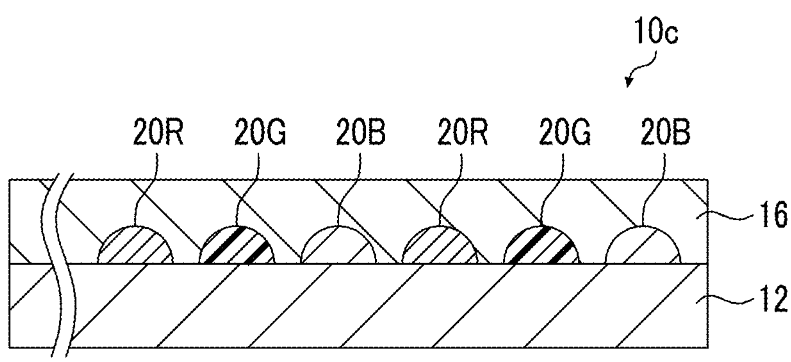
FIG. 3 is a schematic cross-sectional view of another example of the transparent screen of the invention.

For example, the transparent screen 10*c* illustrated in FIG. 3 is configured to include a plurality of red dots 20R that reflect red light in the wavelength region of 610 nm to 690 nm, a plurality of green dots 20G that reflect green light in the wavelength region of 515 nm to 585 nm, and a plurality of blue dots 20B that reflect blue light in the wavelength region of 420 nm to 480 nm.

As such, when dots reflecting red light, dots reflecting green light, and dots reflecting blue light are formed, it is preferable from the viewpoint that the red light, green light and blue light of the video light entering through the front surface can be reflected, and a video image that is projected on the transparent screen can be displayed as a color image, and from the viewpoint that the video light emitted from a video device such as a projector can be utilized regardless of whether the light is red light, green light or blue light.

The example illustrated in FIG. 3 is configured to include dots that respectively reflect red light, green light, and blue light; however, the invention is not intended to be limited to this, and the transparent screen may also include dots that reflect light in other wavelength regions.

It is desirable that the dots that respectively reflect red light, green light, and blue light are dots reflecting light in the above-mentioned wavelength regions, and it is also acceptable that the peak wavelength of the reflected waves may not be included in the range of the wavelength regions described above.

The invention is not limited to a configuration including three kinds of dots that reflect red light, green light, and blue light, respectively, and for example, a configuration including two kinds of dots such as dots that reflect red light and dots that reflect blue light may be employed, or a configuration including four kinds of dots such as the dots respectively reflect red light, green light, and blue light, as well as dots that reflect light in another wavelength region may also be employed. Also, by adjusting the reflection wavelength of the dots according to the wavelengths of the video light emitted from a video device such as a projector, only the video light is reflected efficiently while light having a wavelength that is not included in the video light can be transmitted, and thus, transparency can be further increased. The effect can also be increased by setting the wavelengths of the video light emitted from a video device such as a projector to a narrow band, and adapting the reflection band of the dots of the transparent screen thereto.

In a case in which the transparent screen has two or more kinds of dots that reflect light in wavelength regions different from each other, there are no particular limitations on the arrangement of the dots, and for example, the dots may be arranged alternatingly, or may be arranged randomly.

Figure 4A:
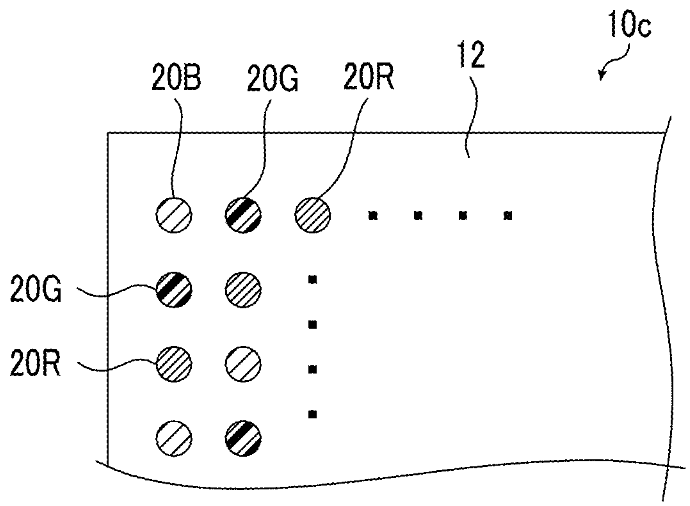
FIGS. 4A and 4B are schematic front views illustrating an example of the dot arrangement pattern in the transparent screen illustrated in FIG. 3.

For example, in the case of the transparent screen 10*c* having three kinds of dots that respectively reflect red light, green light, and blue light, as illustrated in FIG. 4A, which is an example of the front view of the transparent screen 10*c*, red dots 20R, green dots 20G, and blue dots 20B may be arranged in this order, respectively in the vertical direction and the horizontal direction as shown in FIG. 4A.

Figure 4B:
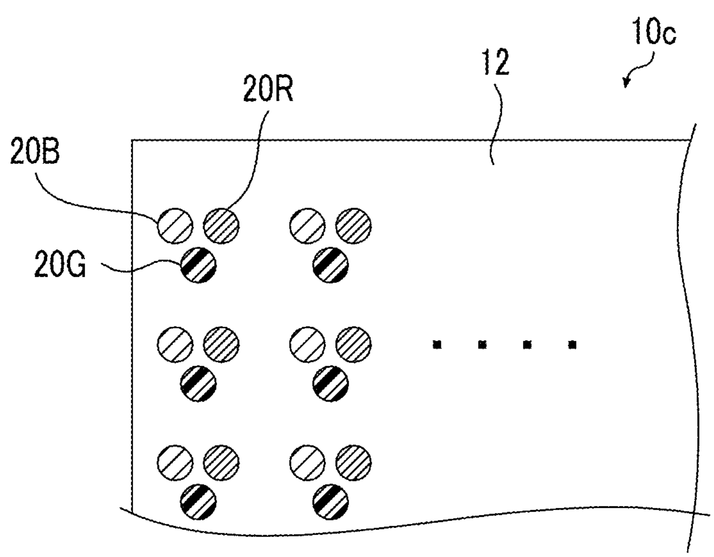

Alternatively, as illustrated in FIG. 4B, which is another example of the front view of the transparent screen 10*c*, a combination of one red dot 20R, one green dot 20G, and one blue dot 20B arranged such that the distance between one another is equal is designated as one set, and the transparent screen may be configured by arranging a plurality of this set in the vertical direction and the horizontal direction as shown in the diagram.

Here, the reflected light of the cholesteric structure of the liquid crystal material that constitutes the dots is circularly polarized light. That is, the cholesteric structure of the liquid crystal material selectively reflects one of right-handed circularly polarized light or left-handed circularly polarized light, and transmits the other.

Figure 5:
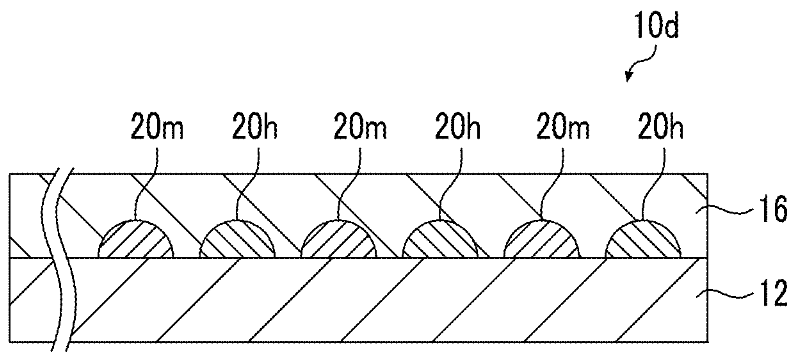
FIG. 5 is a schematic cross-sectional view of another example of the transparent screen of the invention.

Therefore, according to the invention, the plurality of dots 20 thus formed may be configured such that all of the dots 20 reflect the same circularly polarized light, or may be configured to include right-handed polarizing dots 20*m* that reflect right-handed circularly polarized light and left-handed polarizing dots 20*h* that reflect left-handed circularly polarized light, as in the case of the transparent screen 10*d* illustrated in FIG. 5.

When the transparent screen is configured to include dots that reflect right-handed circularly polarized light and dots that reflect left-handed circularly polarized light, it is preferable from the viewpoint that right-handed circularly polarized light and left-handed circularly polarized light of the video light can be reflected, and the reflectance can be increased; from the viewpoint that stereoscopic vision (so-called 3D display) can be implemented by displaying images for the left eye or images for the right eye of a viewer for the right-handed circularly polarized light and the left-handed circularly polarized light, respectively; from the viewpoint that the video light emitted from a video device such as a projector can be utilized even though the video light is right-handed circularly polarized light or left-handed circularly polarized light; and the like.

In a case in which the cholesteric structure of the liquid crystal material selectively reflects any one of right-handed circularly polarized light and left-handed circularly polarized light and transmits the other, when the video light emitted from a video device such as a projector is converted to any one of right-handed circularly polarized light and left-handed circularly polarized light, and the transparent screen is combined with a transparent screen which uses dots that reflect circularly polarized light corresponding to the video light, only the video light can be efficiently reflected while circularly polarized light that is not included in the video light can be transmitted, and thus transparency can be further increased.

The circularly polarized light-selective reflectivity concerning whether the reflected light of a cholesteric structure is right-handed circularly polarized light or left-handed circularly polarized light, depends on the direction of twist of the spiral of the cholesteric structure. Selective reflection by a cholesteric liquid crystal occurs such that in a case in which the direction of twist of the spiral of the cholesteric liquid crystal is right-handed, right-handed circularly polarized light is reflected, and in a case in which the direction of twist of the spiral is left-handed, left-handed circularly polarized light is reflected.

It is also acceptable that the transparent screen has two or more kinds of dots that reflect light in the wavelength regions different from each other, and has dots that reflect right-handed circularly polarized light and dots that reflect left-handed circularly polarized light as the dots that reflect light in various wavelength regions.

Figure 6:
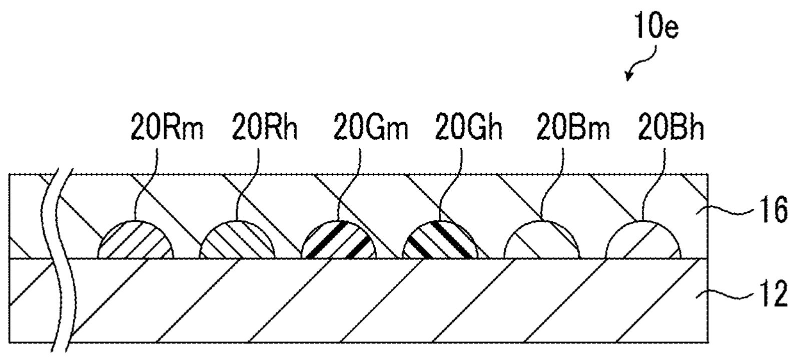
FIG. 6 is a schematic cross-sectional view of another example of the transparent screen of the invention.

FIG. 6 illustrates a cross-sectional view of another example of the transparent screen.

The transparent screen 10*e* illustrated in FIG. 6 is configured to include, as a plurality of dots, right-handed polarizing red dots 20Rm that reflect red light and right-handed circularly polarized light; left-handed polarizing red dots 20Rh that reflect red light and left-handed circularly polarized light; right-handed polarizing green dots 20Gm that reflect green light and right-handed circularly polarized light; left-handed polarizing green dots 20Gh that reflect green light and left-handed circularly polarized light; right-handed polarizing blue dots 20Bm that reflect blue light and right-handed circularly polarized light; and left-handed polarizing blue dots 20Bh that reflect blue light and left-handed circularly polarized light.

As such, when the transparent screen is configured to have two or more kinds of dots that reflect light in wavelength regions different from each other, and to have dots that reflect right-handed circularly polarized light and dots that reflect left-handed circularly polarized light as the dots that reflect light in various wavelength regions, it is preferable from the viewpoint that the video light projected on the transparent screen can be displayed as a color image; from the viewpoint that stereoscopic vision (so-called 3D display) can be implemented by displaying images for the left eye or images for the right eye of a viewer for the right-handed circularly polarized light and the left-handed circularly polarized light, respectively; from the viewpoint that the transparent screen can be utilized independently of the wavelength region or the direction of circularly polarized light of the video light emitted from a video device such as a projector; and the like.

The example illustrated in FIG. 6 is configured to have dots that reflect right-handed circularly polarized light and dots that reflect left-handed circularly polarized light respectively for the two or more kinds of dots that reflect light in wavelength regions different from each other; however, the invention is not limited to this, and the transparent screen may also be configured, for at least one kind among the dots that reflect light in wavelength regions different from each other, to include dots that reflect right-handed circularly polarized light and dots that reflect left-handed circularly polarized light, and for the rest, may be configured to include dots reflecting light that is circularly polarized in any one direction.

The example illustrated in FIG. 3 is configured such that each of the various dots reflects light in one wavelength region; however, the invention is not intended to be limited to this, and the transparent screen may also be configured such that a single dot reflects light in a plurality of wavelength regions. That is, the transparent screen may be configured to include dots having two or more regions that reflect light in wavelength different from each other in a single dot.

Figure 7:
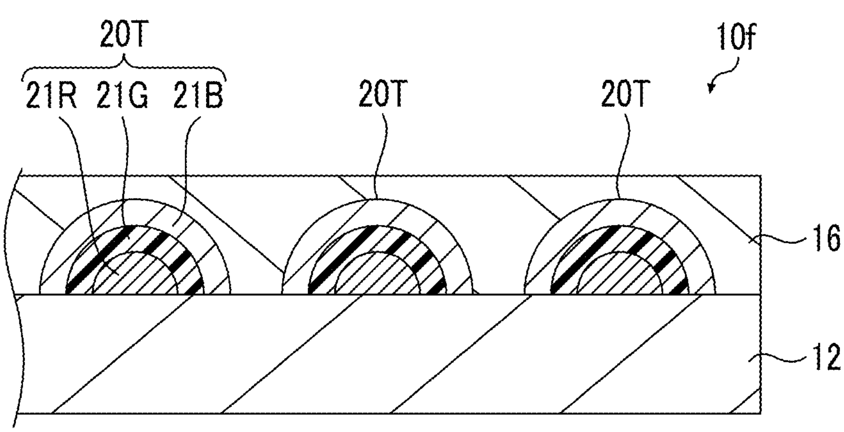
FIG. 7 is a schematic cross-sectional view of another example of the transparent screen of the invention.

FIG. 7 illustrates a schematic cross-sectional view of another example of the transparent screen of the invention.

A transparent screen **10*f* illustrated in FIG. 7 is configured to include, as the plurality of dots, a plurality of three-layered dots 20T having a red region 21R that reflects red light, a green region 21G that reflects green light, and a blue region 21**B that reflects blue light in a single dot.

Specifically, a three-layered dot 20T has a configuration in which three layers, namely, a red region 21R formed in a hemispheric shape on the substrate 12 side; a green region 21G laminated on the surface of the red region 21R; and a blue region 21B laminated on the surface of the green region 21G, are laminated in the direction of the normal line to the substrate 12.

Since such a three-layered dot 20T has a layer reflecting red light, a layer reflecting green light, and a layer reflecting blue light, red light, green light, and blue light of the incident video light can be reflected with a single dot.

Therefore, the video image projected on the transparent screen can be displayed as a color image. The transparent screen can be utilized even if the video light emitted from a video device such as a projector is red light, or green light, or blue light. Furthermore, red light, green light and blue light of the video light can be reflected, and the reflectance can be enhanced.

The example illustrated in FIG. 7 is configured to have three layers respectively reflecting red light, green light, and blue light; however, the invention is not limited to this, and the configuration may include two layers that reflect light in wavelength regions different from each other, or may include four or more layers.

In the example illustrated in FIG. 7, the three-layered dot 20T is configured such that a red region 21R, a green region 21G, and a blue region 21B are laminated in this order from the substrate 12 side; however, the invention is not intended to be limited to this, the order of lamination of the various layers may be of any order.

In the example illustrated in FIG. 5, the transparent screen is configured such that each of the various dots reflect any one of right-handed circularly polarized light and left-handed circularly polarized light; however, the invention is not intended to be limited to this, and the transparent screen may also be configured such that one dot reflects right-handed circularly polarized light and left-handed circularly polarized light. That is, the transparent screen may be configured to include dots each having a region that reflects right-handed circularly polarized light and a region that reflects left-handed circularly polarized light in a single dot.

Figure 8:
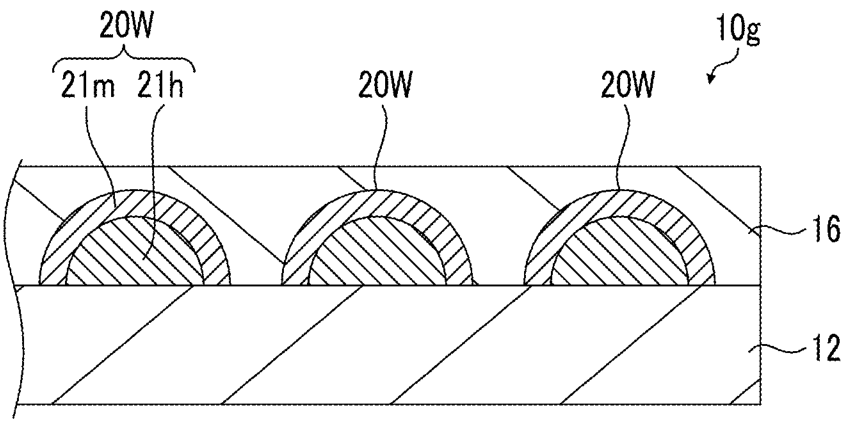
FIG. 8 is a schematic cross-sectional view of another example of the transparent screen of the invention.

FIG. 8 illustrates a schematic cross-sectional view of another example of the transparent screen of the invention.

The transparent screen **10*g* illustrated in FIG. 8 is configured to include, as the plurality of dots, a plurality of two-layered dots 20W having a right-handed polarizing region 21*m* that reflects right-handed circularly polarized light and a left-handed polarizing region 21*h*** that reflects left-handed circularly polarized light in a single dot.

Specifically, a two-layered dot 20W has a configuration in which two layers, namely, a left-handed polarizing region **21*h* formed in a hemispherical shape on the substrate 12 side; and a right-handed polarizing region 21*m* laminated on the surface of the left-handed polarizing region 21*h*, are laminated in the direction of the normal line to the substrate 12**.

Such a two-layered dot 20T has a layer that reflects right-handed circularly polarized light and a layer that reflects left-handed circularly polarized light, and therefore, the two-layered dot 20T can reflect right-handed circularly polarized light and left-handed circularly polarized light of incident video light with a single dot.

Therefore, right-handed circularly polarized light and left-handed circularly polarized light of video light can be reflected, and the reflectance can be enhanced. Furthermore, stereoscopic vision (so-called 3D display) can be implemented by displaying images for the left eye or images for the right eye of a viewer for the right-handed circularly polarized light and the left-handed circularly polarized light of video light, respectively. Also, the transparent screen can be utilized even if the video light emitted from a video device such as a projector is right-handed circularly polarized light or left-handed circularly polarized light.

In the example illustrated in FIG. 8, the two-layered dot 20W is configured to have a left-handed polarizing region **21*h* and a right-handed polarizing region 21*m* laminated in this order from the substrate 12** side; however, the invention is not intended to be limited to this, and the two-layered dot 20W may also be configured to have a right-handed polarizing region 21*m* and a left-handed polarizing region 21*h* laminated in this order.

Furthermore, the various dots may also be configured such that a single dot reflects light in a plurality of wavelength regions, and reflects right-handed circularly polarized light and left-handed circularly polarized light of each of the wavelength regions. That is, the various dots may be configured to include dots each having regions that reflect light in wavelength regions different from each other in a single dot, and having a region that reflects right-handed circularly polarized light and a region that reflects left-handed circularly polarized light for each wavelength region.

Figure 9:
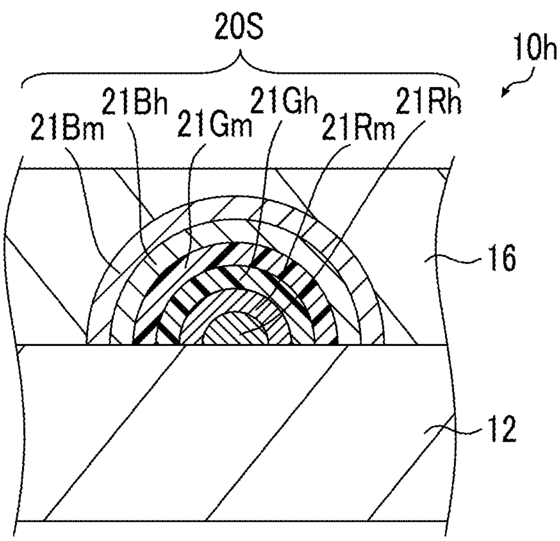
FIG. 9 is a schematic cross-sectional view of another example of the transparent screen of the invention.

FIG. 9 illustrates a schematic cross-sectional view of another example of the transparent screen of the invention.

A transparent screen 10*h* illustrated in FIG. 9 is configured to include, as the plurality of dots, a plurality of six-layered dots 20S each having a left-handed polarizing red region 21Rh that reflects red light and left-handed circularly polarized light; a right-handed polarizing red region 21Rm that reflects red light and right-handed circularly polarized light; a left-handed polarizing green region 21Gh that reflects green light and left-handed circularly polarized light; a right-handed polarizing green region 21Gm that reflects green light and right-handed circularly polarized light; a left-handed polarizing blue region 21Bh that reflects blue light and left-handed circularly polarized light; and a right-handed polarizing blue region 21Bm that reflects blue light and right-handed circularly polarized light, in a single dot.

Specifically, the six-layered dot 20S is configured to have six layers such as a left-handed polarizing red region 21Rh formed in a hemispherical shape on the substrate 12 side; a right-handed polarizing red region 21Rm laminated on the surface of the left-handed polarizing red region 21Rh; a left-handed polarizing green region 21Gh laminated on the surface of the right-handed polarizing red region 21Rm; a right-handed polarizing green region 21Gm laminated on the surface of the left-handed polarizing green region 21Gh; a left-handed polarizing blue region 21Bh laminated on the surface of the right-handed polarizing green region 21Gm; and a right-handed polarizing blue region 21Bm laminated on the surface of the left-handed polarizing blue region 21Bh, laminated in the direction of the normal line to the substrate 12.

Since such a six-layered dot 20S has a layer reflecting right-handed circularly polarized light and a layer reflecting left-handed circularly polarized light for red light; a layer reflecting right-handed circularly polarized light and a layer reflecting left-handed circularly polarized light for green light; and a layer reflecting right-handed circularly polarized light and a layer reflecting left-handed circularly polarized light for blue light, the six-layered dot 20S can reflect right-handed circularly polarized light and left-handed circularly polarized light of red light, green light, and blue light of incident video light with a single dot.

Therefore, a video image projected on the transparent screen can be displayed as a color image. Also, red light, green light, and blue light of video light, and right-handed circularly polarized light and left-handed circularly polarized light of various wavelength regions can be reflected, and the reflectance can be increased. Furthermore, stereoscopic vision (so-called 3D display) can be implemented by displaying images for the left eye or images for the right eye of a viewer for the right-handed circularly polarized light and the left-handed circularly polarized light of video light, respectively. The transparent screen can be utilized even if the video light emitted from a video device such as a projector is red light, green light, or blue light, or even if the video light is right-handed circularly polarized light or left-handed circularly polarized light.

Figure 13:
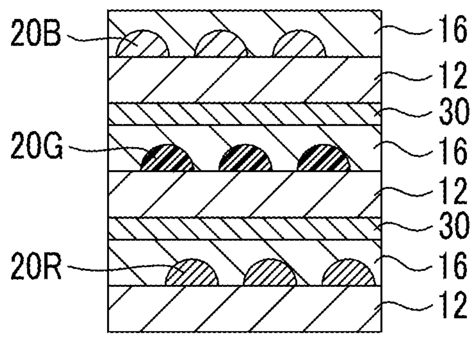
FIG. 13 is a schematic cross-section of another example of the transparent screen of the invention.

The transparent screen of the invention may also be configured by laminating a plurality of members each obtained by forming dots 20 on the surface of a substrate 12 and covering the dots 20 with an overcoat layer 16, by means of a pressure-sensitive adhesive layer 30, similarly to the example illustrated in FIG. 13. The example illustrated in FIG. 13 is an example obtained by laminating three layers of a member having red dots 20R formed thereon, a member having green dots 20G forming thereon, and a member having blue dots 20B formed thereon.

When a plurality of members is laminated, the area ratio obtainable when viewed from the front can be increased with high efficiency, by shifting the position of the dots as viewed from the front. The dots included in the various layers may be any of the above-described dots in connection with reflection wavelength or reflected circular polarization; however, it is particularly preferable to laminate the layers in the order of a member having dots that reflect blue light, a member having dots that reflect green light, and a member having dots that reflect red light from the light incidence side. This is to inhibit the occurrence in which light reflected at a layer farther from the light source is reflected again by a layer closer to the light source and does not return to the viewer's side.

Figure 14:
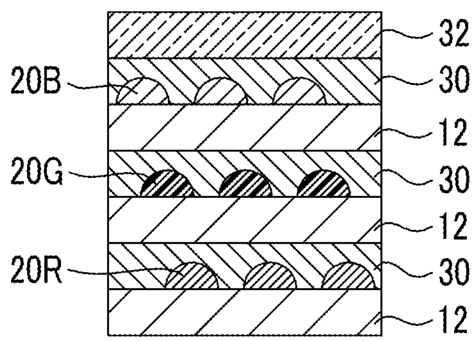
FIG. 14 is a schematic cross-sectional view of another example of the transparent screen of the invention.

The example illustrated in FIG. 13 is configured such that a plurality of members having the dots 20 covered with an overcoat layer 16 are laminated by means of a pressure-sensitive adhesive layer 30; however, a configuration in which the overcoat layer 16 also functions as the pressure-sensitive adhesive layer 30 as in the case of the example illustrated in FIG. 14 may also be employed. At that time, a transparent substrate 32 such as a glass plate may be laminated on the pressure-sensitive adhesive layer 30 on the outermost surface side of the transparent screen, or an overcoat layer 16 that does not have pressure-sensitive adhesiveness may be formed as the outermost surface.

Figure 15:
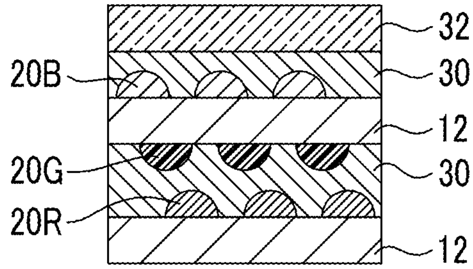
FIG. 15 is a schematic cross-sectional view of another example of the transparent screen of the invention.

It is also acceptable to laminate a member having dots 20 formed on both surfaces of a substrate 12, similarly to the example illustrated in FIG. 15.

Next, the materials, shape and the like of the various constituent elements of the transparent screen of the invention will be described in detail.

[Substrate]

The substrate that is included in the transparent screen of the invention functions as a base material for forming dots on the surface.

It is preferable that the substrate has a low reflectance for light at the wavelength at which the dots reflect light, and it is preferable that the substrate does not include a material that reflects light at the wavelength at which the dots reflect light.

It is also preferable that the substrate is transparent for the visible light region. The substrate may be colored; however, it is preferable that the substrate is not colored or is colored to a low extent. Furthermore, it is preferable that the substrate has a refractive index of about 1.2 to 2.0, and more preferably about 1.4 to 1.8.

When it is said in the present specification that an object is transparent, specifically, the non-polarized light transmittance (omnidirectional transmittance) at a wavelength of 380 to 780 nm may be 50% or higher, may be 70% or higher, and is preferably 85% or higher.

The haze value of the substrate is preferably 30% or lower, more preferably 0.1% to 25%, and particularly preferably 0.1% to 10%. When a substrate having a high haze value such as an antiglare (AG) substrate is used, transparency is deteriorated, and an adjustment of ameliorating the front surface brightness or the viewing angle characteristics is also enabled.

The thickness of the substrate may be selected according to the applications and is not particularly limited. The thickness may be about 5 μm to 1,000 μm, and is preferably 10 μm to 250 μm, and more preferably 15 μm to 150 μm.

The substrate may be single-layered or may be multilayered, and examples of the substrate in the case of being a single layer substrate include substrates formed of glass, triacetyl cellulose (TAC), polyethylene terephthalate (PET), polycarbonate, polyvinyl chloride, acryl, and a polyolefin. As an example of the substrate in the case of being a multilayered substrate, a substrate that has any one of the examples of the substrate in the case of being a single-layered substrate, as a support, and is provided with another layer on the surface of the support, may be mentioned.

Figure 10:
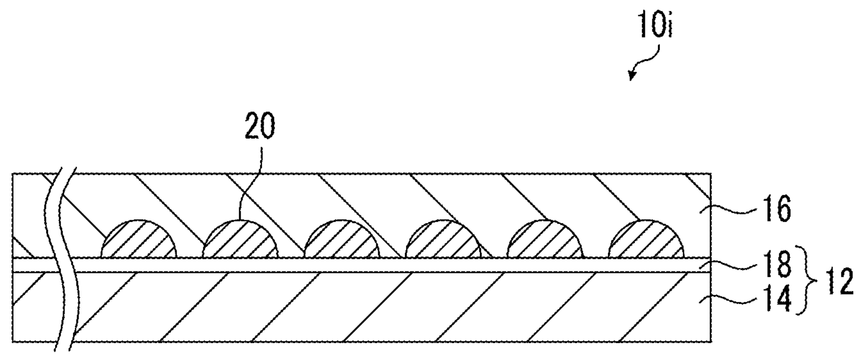
FIG. 10 is a schematic cross-sectional view of another example of the transparent screen of the invention.

For example, an underlayer 18 may be provided between the support 14 and the dots 20, similarly to the transparent screen 10*i* illustrated in FIG. 10. The underlayer is preferably a resin layer, and is particularly preferably a transparent resin layer. Examples of the underlayer include a layer for adjusting the surface shape at the time of forming dots (specifically, for adjusting the surface energy of the underlayer surface), a layer for improving the adhesive characteristics to the dots, and an oriented layer for adjusting the orientation of a polymerizable liquid crystal compound at the time of forming dots.

Regarding the underlayer, it is preferable that the underlayer has a low light reflectance at a wavelength at which the dots reflect light, and it is preferable that the underlayer does not include a material that reflects light at the wavelength at which the dots reflect light. It is also preferable that the underlayer is transparent. Regarding the underlayer, it is preferable that the refractive index is preferably about 1.2 to 2.0, and more preferably about 1.4 to 1.8. It is also preferable that the underlayer is formed of a thermosetting resin or a photocurable resin, which is obtained by curing a composition that is directly applied on the support surface and includes a polymerizable compound. Examples of the polymerizable compound include non-liquid crystal compounds such as a (meth)acrylate monomer and a urethane monomer.

The thickness of the underlayer is not particularly limited, and the thickness is preferably 0.01 to 50 μm, and more preferably 0.05 to 20 μm.

[Dots]

The transparent screen of the invention includes dots formed on the substrate surface. Regarding the substrate surface where dots are formed, the dots may be formed on both surfaces of a substrate, or may be formed on any one surface. In a case in which the dots are formed on both surfaces of a substrate, the reflection intensity can be increased, as the light that has escaped through a portion where dots are not formed on the light incident surface side is reflected at the dots on the back surface side. That is, in a case in which dots are formed on both surfaces of the substrate, it is preferable to form dots on the back surface side at the position where dots are not formed on the front surface side.

It is desirable that two or more dots are formed on the substrate surface. Two or more dots are formed close to each other on the substrate surface, and a plurality of such dot groups are formed. At that time, as illustrated in FIGS. 4A and 4B, two or more dots may be arranged regularly in a predetermined pattern, or may be randomly disposed. The dots may be uniformly arranged over the entire surface of the substrate, or may be arranged at least in a partial region of the substrate only.

Here, the array density of the dots is not particularly limited, and may be appropriately set according to the diffusibility (viewing angle), transparency and the like required for the transparent screen.

From the viewpoint that a balance can be achieved between a wide viewing angle and high transparency, and from the viewpoint of an appropriate density at which dots can be produced without any defects such as coalescence or deletion of dots at the time of production, the area ratio of the dots with respect to the substrate as viewed in the direction of the normal line to a principal surface of the substrate is preferably 1.0% to 90.6%, more preferably 2.0% to 50.0%, and particularly preferably 4.0% to 30.0%.

In regard to the area ratio of the dots, the area ratio in a region having a size of 1 mm×1 mm was measured in an image obtainable with a microscope such as a laser microscope, a scanning electron microscope (SEM) or a transmission electron microscope (TEM), and the average value at 5 sites was designated as the area ratio of the dots.

Similarly, from the viewpoint that a balance can be achieved between a wide viewing angle and high transparency, the pitch between adjacent dots is preferably 20 μm to 500 μm, more preferably 20 μm to 300 μm, and particularly preferably 20 μm to 150 μm.

Furthermore, as illustrated in FIG. 4B, in a case in which the transparent screen is configured by arranging a plurality of a group of RGB having one each of red dots 20R, green dots 20G, and blue dots 20B in the vertical direction and the horizontal direction as shown in the diagram, the pitch between the various dots within the group of RGB is preferably set to 10 μm to 200 μm, and the pitch between adjacent groups is preferably set to 20 μm to 500 μm.

In a case in which there are a large number of dots on the substrate surface, the diameter and shape of the dots may be all identical, or dots having different diameters and shapes may be included; however, it is preferable that the diameter and shape are all identical. For example, dots formed under the same conditions under the intention of forming dots having the same diameter and the same shape, are preferred.

According to the present specification, when the dots are explained, the explanation is applicable to all the dots in the transparent screen of the invention; however, it is acceptable that the transparent screen of the invention that includes the dots thus explained includes dots that do not apply to the conditions of the same explanation due to deviations or errors that are tolerable in the present technical field.

(Shape of Dots)

The dots may be circular when viewed in the direction of the normal line to a principal surface of the substrate (hereinafter, also referred to as substrate normal line direction). The circular shape may not be a perfect circle, and an approximately circular shape is still acceptable. When the term center is used for a dot, this means the center of this circular shape or the center of gravity. In a case in which there are a large number of dots on the substrate surface, it is desirable that the average shape of the dots is circular, and some dots having a shape that is not considered circular may be included.

The dots are such that the diameter as viewed in the substrate normal line direction is preferably 10 to 200 μm, and more preferably 20 to 120 μm.

The diameter of a dot can be obtained by using an image obtainable with a microscope such as a laser microscope, a scanning electron microscope (SEM) or a transmission electron microscope (TEM), and measuring the length of a straight line that extends from an edge (border or boundary line of a dot) to another edge and passes through the center of the dot. The number of dots and the distance between dots can also be checked from a microscopic image obtained with a laser microscope, a scanning electron microscope (SEM), or a transmission electron microscope (TEM).

In a case in which the shape of the dot is other than a circular shape when viewed in the substrate normal line direction, the diameter of a circle having the same circle area as the projected area of this dot (equivalent circle diameter) is designated as the diameter of the dot.

The dot includes a portion having a height that increases continuously to the maximum height in a direction extending from the edge toward the center of the dot. That is, the dot includes an inclined portion or a curved surface portion having a height increasing from the edge toward the center of the dot. According to the present specification, the above-described site may be referred to as an inclined portion or a curved surface portion. The inclined portion or curved surface portion represents a portion that is surrounded by a portion of the dot surface extending from a point that starts to increase continuously to a point representing the maximum height, on the dot surface in a cross-sectional view that is perpendicular to the principal surface of the substrate; a straight line that links those points with the substrate by the minimum distance; and the substrate.

According to the present specification, when the term "height" is used for the dot, this means "the minimum distance from a dot on the surface of the dot on the opposite side of the substrate, to the surface of the substrate on the side where the dot is formed". At this time, the surface of the dot may be an interface with another layer. In a case in which the substrate has surface unevenness, an extension of the substrate surface at the edge of the dot is regarded as the surface on the side where the dot is formed. The maximum height is the maximum value of the height as described above, and for example, the maximum height is the minimum distance from the apex of the dot to the surface of the substrate on the side where the dot is formed. The height of a dot can be checked from a cross-sectional view of the dot that is obtained by focal point scanning by means of a laser microscope, or by using a microscope such as SEM or TEM.

The inclined portion or curved surface portion may be at the edge in the direction of a section as viewed from the center of the dot, or may be at the entirety. For example, when the dot is circular in shape, the edge corresponds to the circumference; however, the edge may be the edge in the direction of a section of the circumference (for example, a part corresponding to a length of 30% or more, 50% or more, 70% or more, and 90% or less of the circumference), or the edge may be an edge in the direction of the entirety of the circumference (90% or more, 95% or more, or 99% or more of the circumference). It is preferable that the edge of a dot is at the entirety. That is, it is preferable that the change in the height in the direction extending from the center of the dot toward the circumference is identical in all directions. Furthermore, it is preferable that the optical properties such as recursive reflectivity and the properties explained in a cross-sectional view are also identical in all directions extending from the center toward the circumference.

The inclined portion or curved surface portion may exist at a certain distance that starts from the edge of the dot (border or boundary line of the circumference) but does not reach the center; may extend from the edge of the dot to the center; may exist at a certain distance that starts from a portion at a certain distance from the border (boundary line) of the circumference of the dot but does not reach the center; or may extend from a portion at a certain distance from the edge of the dot, to the center.

A structure that includes the above-described inclined portion or curved surface portion may be, for example, a hemispherical shape having a flat face on the substrate side, a shape that has been flattened by cutting the top of this hemispherical shape approximately in parallel to the substrate (truncated sphere shape), a conical shape having a face on the substrate side as the bottom face, or a shape that has been flattened by cutting the top of this conical shape approximately in parallel to the substrate (truncated cone shape). Among these, preferred shapes include a hemispherical shape having a flat face on the substrate side, a shape that has been flattened by cutting the top of this hemispherical shape approximately in parallel to the substrate, and a shape that has been flattened by cutting the top of a conical shape, which has a face on the substrate side as the bottom face, approximately in parallel to the substrate. The hemispherical shape is meant to include a hemispherical shape having a face including the center of the sphere as a flat face, as well as any of a spherical segment shape obtainable by arbitrarily cutting a sphere into two (preferably a spherical segment shape that does not include the center of the sphere).

The point on the dot surface that gives the maximum height of the dot may be the apex of a hemispherical shape or a conical shape, or may be on the face that has been flattened by cutting approximately in parallel to the substrate as described above. It is also preferable that all of the dots on the flattened face give the maximum height of the dot. It is also preferable that the center of the dot gives the maximum height.

The angle (for example, an average value) formed by the surface of a dot on the opposite side of the substrate and the substrate (surface of the substrate on the side where the dot is formed), that is, the contact angle between the substrate and the dot is preferably 40° or larger, and more preferably 60° or larger. When the contact angle is adjusted to be in this range, a balance between a wide viewing angle and high transparency can be achieved.

The angle can be checked from a cross-sectional view of the dot that is obtained by focal point scanning by means of a laser microscope, or by using a microscope such as SEM or TEM; however, according to the present specification, the angle of the contacting part between the substrate and the dot surface as measured from a cross-sectional view of SEM image at a surface that includes the center of the dot and is perpendicular to the substrate, is employed.

As described above, the contact angle between the substrate and the dot can be adjusted to a desired range by providing an underlayer between the substrate and the dot.

(Optical Properties of Dots)

The dots have wavelength-selective reflectivity. The light for which the dots exhibit selective reflectivity is not particularly limited, and for example, the light may be any of infrared light, visible light, ultraviolet light, and the like. For example, in a case in which the transparent screen is used as a screen that displays an image created by video light emitted from a video device such as projector, and the background on the back surface side of the transparent screen in a superimposed manner, it is preferable that the light for which the dots exhibit selective reflectivity is visible light.

Alternatively, it is also preferable that the reflection wavelength is selected according to the wavelength of light that is emitted from the light source used in combination.

The dots are formed of a liquid crystal material having a cholesteric structure. The wavelength of the light for which the dots exhibit selective reflectivity can be carried out by adjusting the spiral pitch in the cholesteric structure of the liquid crystal material that forms the dots as described above. In the liquid crystal material that forms the dots for the transparent screen of the invention, since the direction of the spiral axis of the cholesteric structure is controlled as will be described below, the incident light is reflected by specular reflection as well as in various directions.

The dots may be colored; however, it is preferable that the dots are not colored, or the dots are colored to a low extent. Thereby, transparency of the transparent screen can be enhanced.

(Cholesteric Structure)

A cholesteric structure is known to exhibit selective reflectivity for a particular wavelength. The center wavelength $\lambda$ of selective reflection depends on the pitch P of the spiral structure (=period of spiral) in the cholesteric structure, and follows the relation of the average refractive index n of the cholesteric liquid crystal and $\lambda = n \times P$. Therefore, the selective reflection wavelength can be regulated by regulating this pitch of the spiral structure. Since the pitch of the cholesteric structure depends on the type of the chiral agent used together with a polymerizable liquid crystal compound at the time of forming the dots, or the concentration of addition of the chiral agent, a desired pitch can be obtained by adjusting these. In regard to the adjustment of the pitch, a detailed description is given in Fuji Film Research & Development, No. 50 (2005), p. 60-63. In regard to the method for measuring the sense or pitch of a spiral, the methods described in "Ekisho Kagaku Jikken Nyumon (Introduction to Experiments in Liquid Crystal Chemistry)", edited by Japanese Liquid Crystal Society, published by Sigma Shuppan K. K., 2007, p. 46; and "Ekisho Benran (Handbook of Liquid Crystals)", Editorial Committee for the Handbook of Liquid Crystals, Maruzen, Inc., p. 196, can be used.

A cholesteric structure gives a striped pattern of bright parts and dark parts in a cross-sectional view of the dot as observed by scanning electron microscope (SEM). Two repeated sets of the bright part and the dark part (two bright parts and two dark parts) correspond to one pitch of the spiral. From this, the pitch can be measured from a SEM cross-sectional view. The normal lines to the various lines of the striped pattern become the direction of the spiral axis.

The reflected light of the cholesteric structure is circularly polarized light. That is, the reflected light of the dot in the transparent screen of the invention is circularly polarized light. Regarding the transparent screen of the invention, the applications can be selected while taking this circularly polarized light-selective reflectivity into consideration. Whether the reflected light is right-handed circularly polarized light or left-handed circularly polarized light depends on the direction of twist of the spiral of the cholesteric structure. Selective reflection by the cholesteric liquid crystal occurs such that in a case in which the direction of twist of the spiral of the cholesteric liquid crystal is the right-handed direction, the liquid crystal reflects right-handed circularly polarized light, and in a case in which the direction of twist of the spiral is the left-handed direction, the liquid crystal reflects left-handed circularly polarized light.

According to the invention, a cholesteric liquid crystal having any of right-handed twist and left-handed twist may be used for the dots. Alternatively, it is also preferable that the direction of the circularly polarized light is selected to be the same as the direction of circularly polarized light of the light emitted from the light source used in combination.

The direction of rotation of the cholesteric liquid crystal phase can be adjusted by means of the type of the liquid crystal compound or the type of the chiral agent to be added.

The half-value width $\Delta\lambda$ (nm) of the selective reflection zone (circularly polarized light reflection zone) that exhibits selective reflection is such that $\Delta\lambda$ depends on the birefringence $\Delta n$ and the pitch P of the liquid crystal compound, and follows the relation of $\Delta\lambda = \Delta n \times P$. Therefore, control of the width of the selective reflection zone can be carried out by adjusting $\Delta n$. The adjustment of $\Delta n$ can be carried out by adjusting the type of the polymerizable liquid crystal compound or the mixing ratio thereof, or by controlling the temperature at the time of orientation immobilization. The half-value width of the reflection wavelength zone is adjusted according to the applications of the transparent screen of the invention, and for example, the half-value width is desirably 50 to 500 nm, and preferably 100 to 300 nm.

(Cholesteric Structure in Dot)

Figure 16:
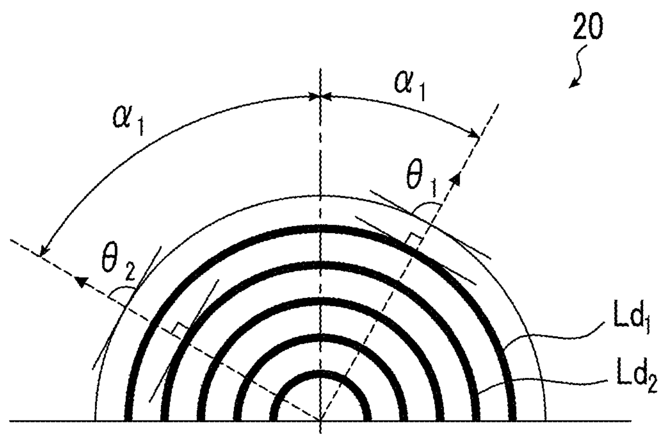
FIG. 16 is a view conceptually illustrating an example of a cross-section of a dot.

Regarding the dot, when the above-mentioned inclined portion or curved surface portion is checked from a cross-sectional view observed by scanning electron microscope (SEM), the angle formed by the normal line to a line that is formed by a first one of the dark parts as counted from the surface of the dot on the opposite side of the substrate and the aforementioned surface is in the range of 70° to 90°. FIG. 16 illustrates a schematic diagram of a cross-section of the dot. In this FIG. 16, the line formed by a dark part is represented by a bold line. As illustrated in FIG. 16, the angle $\theta_1$ forming by the normal line to line $Ld_1$ that is formed by the first dark part and the surface of the dot is 70° to 90°. Here, when the position at the dot surface in the inclined portion or the curved surface portion is represented by angle $\alpha_1$ with respect to a line perpendicular to the substrate surface that passes through the center of the dot, with the angle $\alpha_1$ being at the position of 30° and at the position of 60°, it is desirable that the angle formed by the direction of the normal line to line $Ld_1$ that is formed by the first dark part as counted from the surface of the dot on the opposite side of the substrate and the aforementioned surface is in the range of 70° to 90°. Preferably, it is desirable that for all of the dots at the inclined portion or curved surface portion described above, the angle formed by the direction of the normal line to line $Ld_1$ that is formed by the first dark part as counted from the surface of the dot on the opposite side of the substrate and the aforementioned surface is in the range of 70° to 90°. That is, it is desirable that the above-mentioned angle is satisfied in some part of the inclined portion or the curved surface portion, for example, it is desirable that the aforementioned angle is satisfied continuously, not that the aforementioned angle is satisfied intermittently in some part of the inclined portion or the curved surface portion. When the surface is curved in the cross-sectional view, the angle formed by the surface means an angle formed by the tangent line of the surface. This angle is indicated as an acute angle, and this means that when the angle formed by the normal line and the surface is indicated as an angle of 0° to 180°, the range of angle is 70° to 110°. In regard to the cross-sectional view, it is preferable that all of the lines formed by up to the second dark part as counted from the surface of the dot on the opposite side of the substrate are such that the angle formed by the normal line of the lines, and the aforementioned surface, is in the range of 70° to 90°; it is more preferable that all of the lines formed by up to the 3rd or 4rd dark part as counted from the surface of the dot on the opposite side of the substrate are such that the angle formed by the normal line of the lines and the aforementioned surface is in the range of 70° to 90°; and it is even more preferable that all of the lines formed by up to the 5th to 12th dark part as counted from the surface of the dot on the opposite side of the substrate are such that the angle formed by the normal line of the lines and the aforementioned surface is in the range of 70° to 90°.

The angle is preferably in the range of 80° to 90°, and more preferably in the range of 85° to 90°.

Furthermore, it is preferable that the angle $\theta_2$ formed by the normal line to line $Ld_2$ that is formed by the second dark part as counted from the surface of the dot on the opposite side of the substrate and the aforementioned surface is in the range of 70° to 90°, and it is preferable that the angle formed by the normal line of the lines formed by the 3rd to 20th dark part and the aforementioned surface is also in the range of 70° to 90°.

Figure 17:
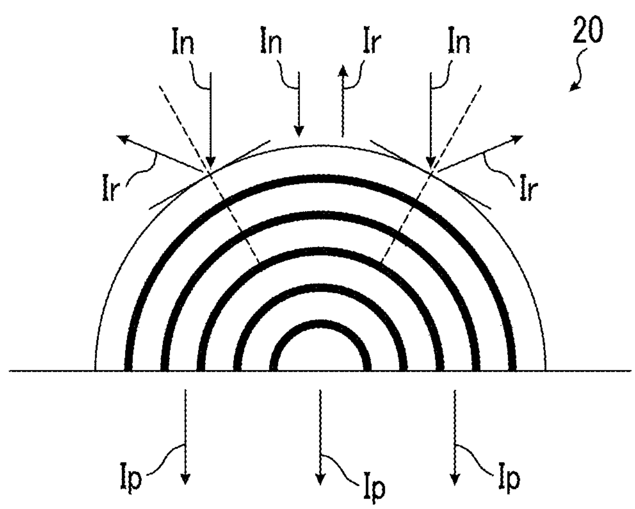
FIG. 17 is a schematic cross-sectional view for explaining the action of dots.

The cross-sectional view provided by SEM shows that at the surface of the dot in the inclined portion or the curved surface portion, the spiral axis of the cholesteric structure forms an angle in the range of 70° to 90° with the surface. Due to such a structure, regarding the light entering into the dot, the light entering in the direction that forms an angle in the direction of the normal line to the substrate can be caused to enter at an angle close to be parallel to the direction of the spiral axis of the cholesteric structure at the inclined portion or the curved surface portion. Therefore, the light entering into the dot can be reflected in various directions. Specifically, since the dot causes specular reflection of incident light relative to the spiral axis of the cholesteric structure, as illustrated in FIG. 17, with respect to light In entering in the direction of the normal line to the substrate, reflected light Ir that is reflected in the vicinity of the center of the dot is reflected in parallel to the direction of the normal line to the substrate. Meanwhile, at a position shifted from the center of the dot (position at which the spiral axis of the cholesteric structure is shifted relative to the direction of the normal line to the substrate), the reflected light Ir is reflected in a direction that is different from the direction of the normal line to the substrate. Therefore, the light entering into the dot can be reflected in various directions, and the viewing angle can be widened. Since the light Ip that is transmitted through the dot is transmitted in the same direction as the incident light In, scattering of the transmitted light is suppressed, the haze can be lowered, and transparency can be increased.

It is also preferable that the light entering in the direction of the normal line to the substrate can be reflected in all directions. Particularly, it is preferable that the angle (half-value angle) at which the brightness becomes half the front surface brightness (peak brightness) can be set to 35° or larger, and the transparent screen has high reflectivity.

At the surface of the dot in the inclined portion or the curved surface portion, since the spiral axis of the cholesteric structure and the surface form an angle in the range of 70° to 90°, it is preferable that the angle formed by the direction of the normal line to a line that is formed by the first dark part as counted from the surface and the direction of the normal line to the substrate decreases continuously as the height increases continuously.

The cross-sectional view is a cross-sectional view in an arbitrary direction including a portion having a height that increases continuously to the maximum height in the direction extending from the edge of the dot toward the center, and typically, the cross-sectional view is desirably a cross-sectional view of any arbitrary surface that includes the center of the dot and is perpendicular to the substrate.

(Method for Producing Cholesteric Structure)

A cholesteric structure can be obtained by immobilizing a cholesteric liquid crystal phase. The structure in which a cholesteric liquid crystal phase is immobilized may be a structure in which the orientation of the liquid crystal compound that forms the cholesteric liquid crystal phase is retained, and typically, the structure may be a structure in which a polymerizable liquid crystal compound is brought into an oriented state of the cholesteric liquid crystal phase and then is polymerized and cured by ultraviolet irradiation, heating or the like, and a layer lacking fluidity is formed and simultaneously changed into a state that is free of any factor causing a change in the oriented state by an external field or an external force. Meanwhile, in regard to the structure obtained by immobilizing the cholesteric liquid crystal phase, it is sufficient if the optical properties of the cholesteric liquid crystal phase are retained, and it is acceptable if the liquid crystal compound has already stopped exhibiting liquid crystal properties. For example, it is acceptable that the polymerizable liquid crystal compound is macromolecularized by a curing reaction and thereby has already lost liquid crystallinity.

The material used for forming the cholesteric structure may be a liquid crystal composition including a liquid crystal compound. The liquid crystal compound is preferably a polymerizable liquid crystal compound.

The liquid crystal composition including a polymerizable liquid crystal compound further includes a surfactant. The liquid crystal composition may further include a chiral agent and a polymerization initiator.

—Polymerizable Liquid Crystal Compound—

The polymerizable liquid crystal compound may be a rod-like liquid crystal compound or a disc-like liquid crystal compound; however, it is preferable that the liquid crystal compound is a disc-like liquid crystal compound.

Examples of a rod-like polymerizable liquid crystal compound that forms a cholesteric liquid crystal layer include a rod-like nematic liquid crystal compound. As the rod-like nematic liquid crystal compound, azomethines, azoxys, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyldioxanes, tolanes, and alkenylcyclohexylbenzonitriles are preferably used. Low molecular weight liquid crystal compounds as well as polymeric liquid crystal compounds can be used.

A polymerizable liquid crystal compound can be obtained by introducing a polymerizable group into a liquid crystal compound. Examples of the polymerizable group include an unsaturated polymerizable group, an epoxy group, and an aziridinyl group, and an unsaturated polymerizable group is preferred, while an ethylenically unsaturated polymerizable group is particularly preferred. A polymerizable group can be introduced into a molecule of a liquid crystal compound by various methods. The number of polymerizable groups that a polymerizable liquid crystal compound can have is preferably 1 to 6, and more preferably 1 to 3. Examples of the polymerizable liquid crystal compound include the compounds described in Makromol. Chem., Vol. 190, p. 2255 (1989); Advanced Materials, Vol. 5, p. 107 (1993); U.S. Pat. Nos. 4,683,327A, 5,622,648A, 5,770,107A, WO95/22586A, WO95/24455A, WO97/00600A, WO98/23580A, WO98/52905A, JP1989-272551A (JP-H01-272551A), JP1994-16616A (JP-H06-16616A), JP1995-110469A (JP-H07-110469A), JP1999-80081A (JP-H11-80081A), and JP2001-

328973A. Two or more kinds of polymerizable liquid crystal compounds may be used in combination. When two or more kinds of polymerizable liquid crystal compounds are used in combination, the orientation temperature can be lowered.

Specific examples of the polymerizable liquid crystal compound include compounds represented by General Formulae (1) to (11).

(1)

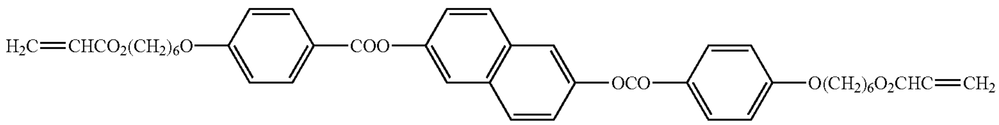

(2)

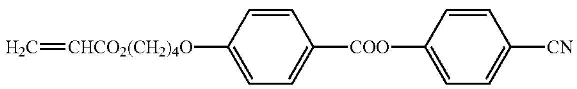

(3)

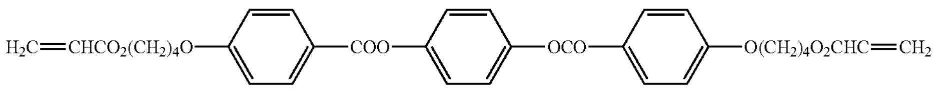

(4)

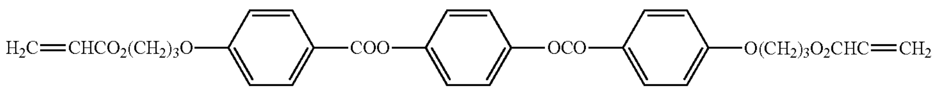

(5)

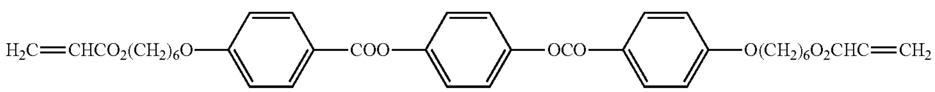

(6)

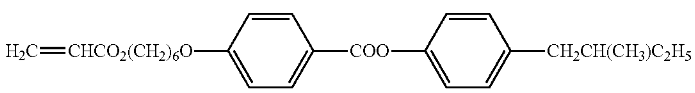

(7)

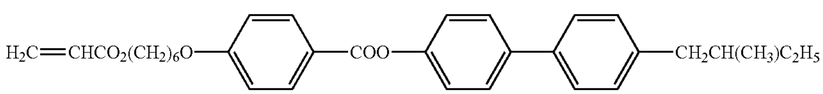

(8)

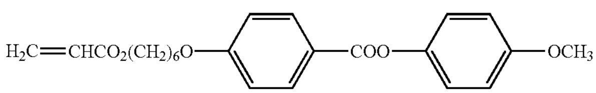

(9)

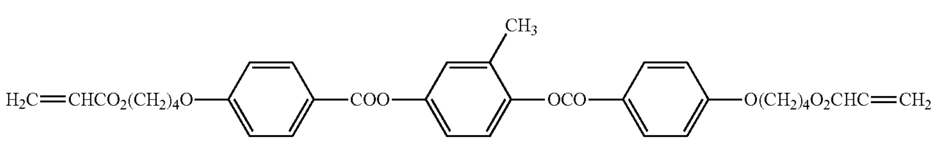

(10)

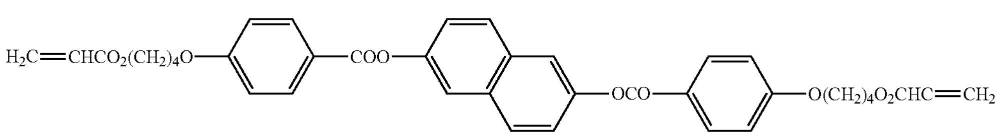

(11)

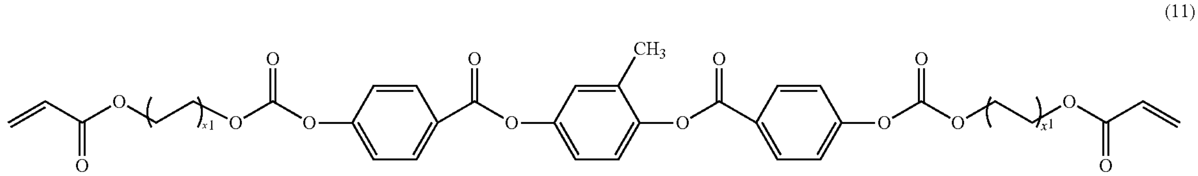

[wherein in Compound (11), $X^1$ is 2 to 5 (integer).]

As a polymerizable liquid crystal compound other than those described above, cyclic organopolysiloxane compounds having, a cholesteric phase as disclosed in JP1982-165480A (JP-S57-165480A), and the like can be used.

Furthermore, regarding the polymeric liquid crystal compound described above, a polymer in which a mesogenic group that exhibits liquid crystallinity has been introduced into a position at the main chain, a side chain, or both of the main chain and a side chain; a polymer cholesteric liquid crystal in which a cholesteryl group has been introduced into a side chain; the liquid crystalline polymer disclosed in JP1997-133810A (JP-H09-133810A); the liquid crystalline polymer disclosed in JP1999-293252A (JP-H11-293252A), and the like can be used.

The amount of addition of the polymerizable liquid crystal compound in the liquid crystal composition is preferably 75% to 99.9% by mass, more preferably 80% to 99% by mass, and particularly preferably 85% to 90% by mass, with respect to the solid content mass (mass excluding the solvent) of the liquid crystal composition.

—Surfactant—

The inventors found that by adding a surfactant to the liquid crystal composition that is used when dots are formed, the polymerizable liquid crystal compound is horizontally oriented on the air interface side at the time of forming the dots, and dots having the direction of the spiral axis controlled as explained above are obtained. Generally, for the purpose of forming the dots, it is necessary not to lower the surface tension in order to maintain the liquid droplet shape at the time of printing. Therefore, it is surprising that it is possible to form dots even if a surfactant is added, and dots having high recursive reflectivity in multiple directions are obtained. In the Examples described below, it is shown that in a transparent screen manufactured by using a surfactant, a dot in which the angle formed by the dot surface and the substrate at the dot edge is 40° or larger is formed. That is, it is understood that by adding a surfactant at the time of forming a dot, the contact angle between the dot and the substrate can be formed in an angle range by which a balance between a wide viewing angle and high transparency can be achieved.

The surfactant is preferably a compound capable of functioning as an orientation controlling agent that contributes in order to obtain a cholesteric structure with planar orientation stably and rapidly. Examples of the surfactant include silicone-based surfactants and fluorine-based surfactants, and fluorine-based surfactants are preferred.

Specific examples of the surfactant include the compounds described in paragraphs [0082] to [0090] of JP2014-119605A, the compounds described in paragraphs [0031] to [0034] of JP2012-203237A, the compounds listed as examples in paragraphs [0092] and [0093] of JP2005-99248A, the compounds listed as examples in paragraphs [0076] to [0078] and paragraphs [0082] to [0085] of JP2002-129162A, and the fluoro(meth)acrylate-based polymers described in paragraphs [0018] to [0043] of JP2007-272185A.

As the horizontal orientation agent, one kind of agent may be used singly, or two or more kinds of agents may be used in combination.

As the fluorine-based surfactant, a compound represented by General Formula (I) described in paragraphs [0082] to [0090] of JP2014-119605A is particularly preferred.

$$(Hb^{11}\text{-}Sp^{11}\text{-}L^{11}\text{-}Sp^{12}\text{-}L^{12})_{m11}\text{-}A^{11}\text{-}L^{13}\text{-}T^{11}\text{-}L^{14}\text{-}A^{12}\text{-}(L^{15}\text{-}Sp^{13}\text{-}L^{16}\text{-}Sp^{14}\text{-}Hb^{11})_{n11} \quad \text{General Formula (I)}$$

In General Formula (I), $L^{11}$, $L^{12}$, $L^{13}$, $L^{14}$, $L^{15}$, and $L^{16}$ each independently represent a single bond, —O—, —S—, —CO—, —COO—, —OCO—, —COS—, —SCO—, —NRCO—, or —CONR— (wherein R in General Formula (I) represents a hydrogen atom or an alkyl group having 1 to 6 carbon atoms). —NRCO— and —CONR— have an effect of lowering solubility. —O—, —S—, —CO—, —COO—, —OCO—, —COS—, or —SCO— is more preferable, from the viewpoint of having a tendency that the haze increases at the time of producing dots, and —O—, —CO—, —COO—, or —OCO— is even more preferable, from the viewpoint of stability of the compound. The alkyl group that can be adopted by R may be linear or branched. The number of carbon atoms is more preferably 1 to 3, and examples include a methyl group, an ethyl group, and an n-propyl group.

$Sp^{11}$, $Sp^{12}$, $Sp^{13}$, and $Sp^{14}$ each independently represent a single bond or an alkylene group having 1 to 10 carbon atoms, and are each more preferably a single bond or an alkylene group having 1 to 7 carbon atoms, and even more preferably a single bond or an alkylene group having 1 to 4 carbon atoms. However, the hydrogen atoms of the alkylene group may be substituted by fluorine atoms. The alkylene group may or may not be branched; however, an unbranched, linear alkylene group is preferred. From the viewpoint of synthesis, it is preferable that $Sp^{11}$ and $Sp^{14}$ are identical, while $Sp^{12}$ and $Sp^{13}$ are identical.

$A^{11}$ and $A^{12}$ each represent a monovalent to tetravalent aromatic hydrocarbon group. The number of carbon atoms of the aromatic hydrocarbon group is preferably 6 to 22, more preferably 6 to 14, even more preferably 6 to 10, and still more preferably 6. The aromatic hydrocarbon group represented by $A^{11}$ or $A^{12}$ may have a substituent. Examples of such a substituent include an alkyl group having 1 to 8 carbon atoms, an alkoxy group, a halogen atom, a cyano group, and an ester group. Regarding an explanation on these groups and preferred ranges thereof, reference can be made to the description concerning the following T. Examples of the substituent for the aromatic hydrocarbon group represented by $A^{11}$ or $A^{12}$ include a methyl group, an ethyl group, a methoxy group, an ethoxy group, a bromine atom, a chlorine atom, and a cyano group. A molecule having many perfluoroalkyl moieties in the molecule can orient liquid crystal molecules even if added in a small amount, and since this leads to a decrease in the haze, it is preferable that $A^{11}$ and $A^{12}$ are tetravalent so as to have more many perfluoroalkyl groups in the molecule. From the viewpoint of synthesis, it is preferable that $A^{11}$ and $A^{12}$ are identical.

It is preferable that $T^{11}$ represents a divalent group represented by

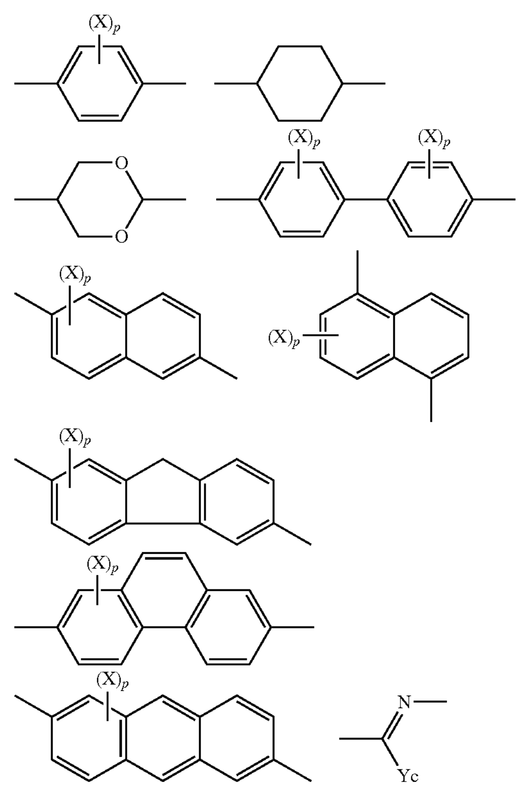

-continued

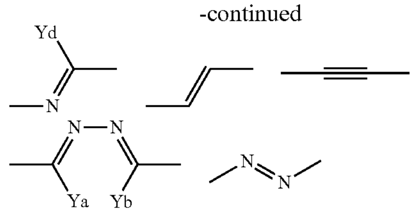

or a divalent aromatic heterocyclic group (wherein X included in $T^{11}$ represents an alkyl group having 1 to 8 carbon atoms, an alkoxy group, a halogen atom, a cyano group, or an ester group; and Ya, Yb, Yc, and Yd each independently represent a hydrogen atom or an alkyl group having 1 to 4 carbon atoms), and $T^{11}$ is more preferably,

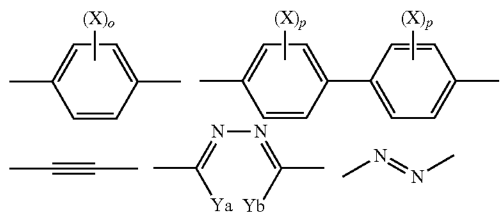

and even more preferably,

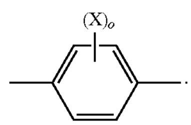

The number of carbon atoms of the alkyl group that can be adopted by X included in $T^{11}$ is 1 to 8, preferably 1 to 5, and more preferably 1 to 3. The alkyl group may be any of a linear group, a branched group, and a cyclic group, and the alkyl group is preferably a linear or branched group. Preferred examples of the alkyl group include a methyl group, an ethyl group, an n-propyl group, and an isopropyl group, and among them, a methyl group is preferred. For the alkyl moiety of the alkoxy group that can be adopted by X included in $T^{11}$, reference can be made to the explanation and preferred range for the alkyl group that can be adopted by X included in $T^{11}$. Examples of the halogen atom that can be adopted by X include in $T^{11}$ include a fluorine atom, a chlorine atom, a bromine atom, and an iodine atom, and a chlorine atom and a bromine atom are preferred. Examples of the ester group that can be adopted by X included in $T^{11}$ include a group represented by R'COO—. R' may be an alkyl group having 1 to 8 carbon atoms. Regarding the explanation and a preferred range for the alkyl group that can be adopted by R', reference can be made to the explanation and preferred range for the alkyl group that can be adopted by X included in $T^{11}$. Specific examples of the ester include $CH_3COO$— and $C_2H_5COO$—. The alkyl group having 1 to 4 carbon atoms that can be adopted by Ya, Yb, Yc, and Yd may be a linear group or a branched group. Examples thereof include a methyl group, an ethyl group, an n-propyl group, and an isopropyl group.

It is preferable that the divalent aromatic heterocyclic group has a 5-membered, 6-membered, or 7-membered heterocyclic ring. A 5-membered ring or a 6-membered ring is more preferred, and a 6-membered ring is most preferred.

Preferred examples of the heteroatom that constitutes the heterocyclic ring include a nitrogen atom, an oxygen atom, and a sulfur atom. The heterocyclic ring is preferably an aromatic heterocyclic ring. The aromatic heterocyclic ring is generally an unsaturated heterocyclic ring. An unsaturated heterocyclic ring having the largest number of double bonds is more preferred. Examples of the heterocyclic ring include a furan ring, a thiophene ring, a pyrrole ring, a pyrroline ring, a pyrrolidine ring, an oxazole ring, an isoxazole ring, a thiazole ring, an isothiazole ring, an imidazole ring, an imidazoline ring, an imidazolidine ring, a pyrazole ring, a pyrazoline ring, a pyrazolidine ring, a triazole ring, a furazan ring, a tetrazole ring, a pyran ring, a thiine ring, a pyridine ring, a piperidine ring, an oxazine ring, a morpholine ring, a thiazine ring, a pyridazine ring, a pyrimidine ring, a pyrazine ring, a piperazine ring, and a triazine ring. The divalent heterocyclic ring may have a substituent. Regarding the explanation and preferred ranges for the examples of the substituent, reference can be made to the explanation and description related to the substituent that can be adopted by the monovalent to tetravalent aromatic hydrocarbon of $A^1$ and $A^2$.

$Hb^{11}$ represents a perfluoroalkyl group having 2 to 30 carbon atoms, and $Hb^{11}$ is more preferably a perfluoroalkyl group having 3 to 20 carbon atoms, and even more preferably a perfluoroalkyl group having 3 to 10 carbon atoms. The perfluoroalkyl group may be any of a linear group, a branched group, and a cyclic group; however, the perfluoroalkyl group is preferably a linear or branched group, and more preferably a linear group.

m11 and n11 each independently represent 0 to 3, and m11+n11≥1. At this time, a plurality of the structures described within the parentheses may be identical with or different from each other; however, it is preferable that the structures are identical with each other. m11 and n11 in General Formula (I) are determined based on the valence of $A^{11}$ and $A^{12}$, and preferred ranges thereof are also determined based on the preferred ranges for the valence of $A^{11}$ and $A^{12}$.

o and p included in $T^{11}$ each independently represent an integer of 0 or larger, and when o and p are 2 or larger, the plurality of X's may be identical with or different from each other. o included in $T^{11}$ is preferably 1 or 2. P included in $T^{11}$ is preferably an integer of 1 to 4, and more preferably 1 or 2.

The compound represented by General Formula (I) is such that the molecular structure may have symmetry, or may not have symmetry. The term symmetry as used herein means that the molecular structure corresponds to at least any one of point symmetry, line symmetry, and rotational symmetry, and the term asymmetry means that the molecular structure does not correspond to any of point symmetry, line symmetry, and rotational symmetry.

The compound represented by General Formula (I) is a compound in which the perfluoroalkyl group ($Hb^{11}$) described above, linking groups $-(-Sp^{11}-L^{11}-Sp^{12}-L^{12})m_{11}-A^{11}-L^{13}-$ and $-L^{14}-A^{12}-(L^{15}-Sp^{13}-L^{16}-Sp^{14}-)n_{11}-$, and T, which is preferably a divalent group having an excluded volume effect, are combined. It is preferable that the two perfluoroalkyl group ($Hb^{11}$) existing in the molecule are identical with each other, and it is also preferable that the linking groups $-(-Sp^{11}-L^{11}-Sp^{12}-L^{12})m_{11}-A^{11}-L^{13}-$ and $-L^{14}-A^{12}-(L^{15}-Sp^{13}-L^{16}-Sp^{14}-)n_{11}-$ existing in the molecule are also identical with each other. It is preferable that terminal $Hb^{11}-Sp^{11}-L^{11}-Sp^{12}-$ and $-Sp^{13}-L^{16}-Sp^{14}-Hb^{11}$ are groups represented by any of the following general formulae.

$(C_aF_{2a+1})—(C_bH_{2b})—$ $(C_aF_{2a+1})—(C_bH_{2b})—O—(C_rH_{2r})—$ $(C_aF_{2a+1})—(C_bH_{2b})—COO—(C_rH_{2r})—$ $(C_aF_{2a+1})—(C_bH_{2b})—OCO—(C_rH_{2r})—$

In the above formulae, a is preferably 2 to 30, more preferably 3 to 20, and even more preferably 3 to 10. b is preferably 0 to 20, more preferably 0 to 10, and even more preferably 0 to 5. a+b is 3 to 30. r is preferably 1 to 10, and more preferably 1 to 4.

Furthermore, it is preferable that the terminal $Hb^{11}$-$Sp^{11}$-$L^{11}$-$Sp^{12}$-$L^{12}$- and -$L^{15}$-$Sp^{13}$-$L^{16}$-$Sp^{14}$-$Hb^{11}$ in General Formula (I) are each a group represented by any of the following general formulae.

$(C_aF_{2a+1})—(C_bH_{2b})—O—$ $(C_aF_{2a+1})—(C_bH_{2b})—COO—$ $(C_aF_{2a+1})—(C_bH_{2b})—O—(C_rH_{2r})—O—$ $(C_aF_{2a+1})—(C_bH_{2b})—COO—(C_rH_{2r})—COO—$ $(C_aF_{2a+1})—(C_bH_{2b})—OCO—(C_rH_{2r})—COO—$

The definitions of a, b, and r in the above formulae are the same as the definitions given right above.

The amount of addition of the surfactant in the liquid crystal composition is preferably 0.01% by mass to 10% by mass, more preferably 0.01% by mass to 5% by mass, and particularly preferably 0.02% by mass to 1% by mass, with respect to the total mass of the polymerizable liquid crystal compound.

—Chiral Agent (Optically Active Compound)—

A chiral agent has a function of creating a spiral structure of the cholesteric liquid crystal phase. Since chiral compounds have different directions of twist of the spiral or different pitches of the spiral created by the compounds, the chiral compound may be selected according to the purpose.

There are no particular limitations on the chiral agent, and known compounds (for example, described in Handbook of Liquid Crystal Devices, Chapter 3, Section 4-3, Chiral agents for TN and STN, p. 199, edited by the $142^{nd}$ Committee of Japan Society for the Promotion of Science (1989)), isosorbide, and isomannide derivatives can be used.

A chiral agent generally includes an asymmetric carbon atom; however, an axially asymmetric compound or a plane-asymmetric compound, which does not include an asymmetric carbon atom, can also be used as a chiral agent. Examples of the axially asymmetric compound or plane-asymmetric compound include binaphthyl, helicene, paracyclophane, and derivatives thereof. The chiral agent may have a polymerizable group. In a case in which both the chiral agent and the liquid crystal compound have a polymerizable group, a polymer having a repeating unit derived from a polymerizable liquid crystal compound and a repeating unit derived from a chiral agent can be formed by a polymerization reaction between the polymerizable chiral agent and the polymerizable liquid crystal compound. In the aspect, it is preferable that the polymerizable group of the polymerizable chiral agent is a group of the same kind as the polymerizable group of the polymerizable liquid crystal compound. Therefore, it is preferable that the polymerizable group of the chiral agent is also an unsaturated polymerizable group, an epoxy group, or an aziridinyl group; more preferably an unsaturated polymerizable group; and particularly preferably an ethylenically unsaturated polymerizable group.

The chiral agent may also be a liquid crystal compound.

In a case in which the chiral agent has a photoisomerizable group, it is preferable since a desired pattern of reflection wavelength corresponding to the emitted light wavelength can be formed by photomask irradiation with active light rays or the like after application and orientation. The photoisomerizable group is preferably an isomerization site of a compound exhibiting photochromic properties, an azo group, an azoxy group, or a cinnamoyl group. Specific compounds that can be used include the compounds described in JP2002-80478A, JP2002-80851A, JP2002-179668A, JP2002-179669A, JP2002-179670A, JP2002-179681A, JP2002-179682A, JP2002-338575A, JP2002-338668A, JP2003-313189A, and JP2003-313292A.

Specific examples of the chiral agent include a compound represented by Formula (12).

(12)

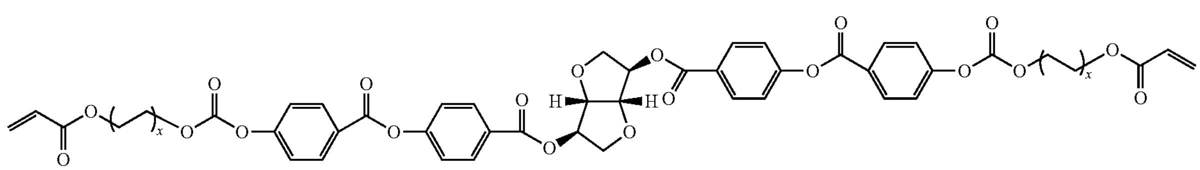

wherein X represents 2 to 5 (integer).

The content of the chiral agent in the liquid crystal composition is preferably 0.01 mol % to 200 mol %, and more preferably 1 mol % to 30 mol %, of the amount of the polymerizable liquid crystal compound.

—Polymerization Initiator—

In a case in which a polymerizable compound is included in the liquid crystal composition, it is preferable that the liquid crystal composition includes a polymerization initiator. In an aspect of carrying out a polymerization reaction by ultraviolet irradiation, the polymerization initiator to be used is preferably a photopolymerization initiator capable of initiating the polymerization reaction by ultraviolet irradiation. Examples of the photopolymerization initiator include α-carbonyl compounds (described in U.S. Pat. Nos. 2,367,661A and 2,367,670A), acyloin ethers (described in U.S. Pat. No. 2,448,828A), α-hydrocarbon-substituted aromatic acyloin compounds (described in U.S. Pat. No. 2,722,512A), polynuclear quinone compounds (described in U.S. Pat. Nos. 3,046,127A and 2,951,758A), combinations of a triarylimidazole dimer and p-aminophenyl ketone (described in U.S. Pat. No. 3,549,367A), acridine and phenazine compounds (described in JP1985-105667A (JP-S60-105667A) and U.S. Pat. No. 4,239,850A), and oxadiazole compounds (described in U.S. Pat. No. 4,212,970A).

The content of the photopolymerization initiator in the liquid crystal composition is preferably 0.1% to 20% by mass, and more preferably 0.5% by mass to 12% by mass, with respect to the content of the polymerizable liquid crystal compound.

—Crosslinking Agent—

The liquid crystal composition may optionally include a crosslinking agent for the purpose of enhancing the film hardness after curing and enhancing durability. Regarding the crosslinking agent, an agent capable of curing by means of ultraviolet radiation, heat, moisture, or the like can be suitably used.

The crosslinking agent is not particularly limited and can be appropriately selected according to the purpose. Examples include polyfunctional acrylate compounds such as trimethylolpropane tri(meth)acrylate and pentaerythritol tri(meth)acrylate; epoxy compounds such as glycidyl (meth) acrylate and ethylene glycol diglycidyl ether; aziridine compounds such as 2,2-bishydroxymethylbutanol tris[3-(1-aziridinyl) propionate] and 4,4-bis (ethyleneiminocarbonylamino)diphenylmethane; isocyanate compounds such as hexamethylene diisocyanate and biuret type isocyanate; polyoxazoline compounds having an oxazoline group in a side chain; and alkoxysilane compounds such as vinyltrimethoxysilane and N-(2-aminoethyl)-3-aminopropyltrimethoxysilane. Furthermore, a known catalyst can be used according to the reactivity of the crosslinking agent, and thus productivity can be enhanced in addition to the enhancement of film hardness and durability. These may be used singly, or two or more kinds thereof may be used in combination.

The content of the crosslinking agent is preferably 3% by mass to 20% by mass, and more preferably 5% by mass to 15% by mass. If the content of the crosslinking agent is less than 3% by mass, an effect of increasing the crosslinking density may not be obtained, and if the content is more than 20% by mass, stability of the cholesteric liquid crystal layer may be deteriorated.

—Other Additives—

In the case of using the inkjet method that will be described below as the method for forming dots, a monofunctional polymerizable monomer may be used in order to obtain ink properties that are generally required. Examples of the monofunctional polymerizable monomer include 2-methoxyethyl acrylate, isobutyl acrylate, isooctyl acrylate, isodecyl acrylate, and octyl/decyl acrylate.

The liquid crystal composition may further include, if necessary, a polymerization inhibitor, an oxidation inhibitor, an ultraviolet absorber, a photostabilizer, a coloring material, and metal oxide fine particles, to the extent that the optical performance and the like are not deteriorated.

It is preferable that the liquid crystal composition is used as a liquid at the time of forming the dots.

The liquid crystal composition may include a solvent. The solvent is not particularly limited and can be appropriately selected according to the purpose; however, an organic solvent is preferably used.

The organic solvent is not particularly limited and can be appropriately selected according to the purpose. Examples thereof include ketones such as methyl ethyl ketone and methyl isobutyl ketone; alkyl halides, amides, sulfoxides, heterocyclic compounds, hydrocarbons, esters, and ethers. These may be used singly or in combination of two or more kinds thereof. Among these, when the environmental burden is taken into consideration, ketones are particularly preferred. The above-mentioned components such as the monofunctional polymerizable monomer may also function as the solvent.

The liquid crystal composition is applied onto a substrate and then is cured. Thus, dots are formed. Application of the liquid crystal composition onto the substrate is preferably carried out by applying as droplets. When a plurality (usually, a large number) of dots are applied onto the substrate, printing by using the liquid crystal composition as an ink may be carried out. The printing method is not particularly limited, and an inkjet method, a gravure printing method, a flexographic printing method, and the like can be used; however, an inkjet method is particularly preferred. A pattern of dots can also be formed by applying a known printing technology.

As illustrated in FIG. 7 to FIG. 9, in the case of a dot having a plurality of regions that reflect light in wavelength regions different from each other in a single dot, or in the case of a dot having a layer reflecting right-handed circularly polarized light and a region reflecting left-handed circularly polarized light in a single dot, first, a first layer is formed by applying as droplets a liquid crystal composition that becomes a layer on the substrate side by the above-mentioned printing method and curing the liquid crystal composition, and then a second layer is formed by applying as droplets a liquid crystal composition that becomes a second layer over the first layer and curing the liquid crystal composition. Furthermore, a third layer and so forth are also formed by the same method. Thereby, a dot having a plurality of regions having different wavelength regions or directions of polarization of reflected light can be formed.

The liquid crystal composition after being applied onto the substrate is dried or heated as necessary, and then is cured. It is desirable if the polymerizable liquid crystal compound in the liquid crystal composition is oriented by the process of drying or heating. In the case of performing heating, the heating temperature is preferably 200° C. or lower, and more preferably 130° C. or lower.

The liquid crystal compound thus oriented may be further polymerized. Polymerization may be any of thermal polymerization and photopolymerization based on light irradiation; however, photopolymerization is preferred. It is preferable to use ultraviolet radiation for light irradiation. The irradiation energy is preferably 20 mJ/cm$^2$ to 50 J/cm$^2$, and more preferably 100 mJ/cm$^2$ to 1,500 mJ/cm$^2$. In order to accelerate the photopolymerization reaction, light irradiation may be carried out under heating conditions or in a nitrogen atmosphere. The wavelength of ultraviolet radiation radiated is preferably 250 nm to 430 nm. The polymerization reaction ratio is preferably higher from the viewpoint of stability, and the polymerization reaction ratio is preferably 70% or higher, and more preferably 80% or higher.

The polymerization reaction ratio can be determined by determining the consumption ratio of the polymerizable functional group using an IR absorption spectrum.

[Overcoat Layer]

The transparent screen may include an overcoat layer. The overcoat layer may be provided on the surface of the substrate where the dots have been formed, and it is preferable that the overcoat layer flattens the surface of the transparent screen.

The overcoat layer is not particularly limited; however, as described above, it is preferable as the difference in the refractive index between the overcoat layer and the dots is smaller, and it is preferable that the difference in the refractive index is 0.04 or less. Since the refractive index of the dots formed of a liquid crystal material is about 1.6, it is preferable that the overcoat layer is a resin layer having a refractive index of about 1.4 to 1.8. By using an overcoat layer having a refractive index that is close to the refractive index of the dots, the angle of light that actually enters into the dot from the normal line (polar angle) can be made smaller. For example, when light is caused to enter the transparent screen at a polar angle of 45° using an overcoat layer having a refractive index of 1.6, the polar angle of light that actually enters the dot can be adjusted to about 27°. Therefore, by using an overcoat layer, the polar angle of light at which the transparent screen exhibits recursive reflectivity can be extended, and even for a dot having a small angle formed by the surface of the dot on the opposite side of the substrate and the substrate, higher recursive reflectivity can be obtained in a wider range. The overcoat layer may also have a function as an antireflective layer, a pressure-sensitive adhesive layer, an adhesive layer, or a hard coat layer.

An example of the overcoat layer may be a resin layer obtainable by applying a composition including a monomer on the surface of the substrate where dots have been formed, and then curing the coating film. The resin is not particularly limited, and the resin may be selected in consideration of adhesiveness to the substrate or the liquid crystal material with which the dots are forming, or the like. For example, a thermoplastic resin, a thermosetting resin, and an ultraviolet-curable resin can be used. In view of durability, solvent resistance and the like, a resin of the type that is cured by crosslinking is preferred, and particularly, an ultraviolet-curable resin that can be cured in a short period of time is preferred. Examples of the monomer that can be used to form the overcoat layer include ethyl (meth)acrylate, ethylhexyl (meth)acrylate, styrene, methylstyrene, N-vinylpyrrolidone, polymethylolpropane tri(meth)acrylate, hexanediol (meth)acrylate, tripropylene glycol di(meth)acrylate, diethylene glycol di(meth)acrylate, pentaerythritol tri(meth) acrylate, dipentaerythritol hexa(meth)acrylate, 1,6-hexanediol di(meth)acrylate, and neopentyl glycol di(meth)acrylate.

The thickness of the overcoat layer is not particularly limited, and may be determined in consideration of the maximum height of the dot. The thickness may be about 5 μm to 100 μm, preferably 10 μm to 50 μm, and more preferably 20 μm to 40 μm. The thickness is the distance from the dot-formed surface of the substrate in the area where there are no dots, to the surface of the overcoat layer on the opposite surface.

Thus, the transparent screen of the invention has been explained in detail; however, the invention is not intended to be limited to the examples described above. It is obvious that various improvements and modifications may be made to the extent that the gist of the invention is maintained.

EXAMPLES

Features of the invention will be more specifically explained below by way of Examples. The materials, reagents, amounts of use, amounts of materials, ratios, treatments, procedures and the like disclosed in the following Examples can be modified as appropriate as long as the gist of the invention is maintained. Therefore, the scope of the invention should not be interpreted limitedly by the specific examples described below.

Example 1

(Production of Underlayer)

A composition as described below was stirred and dissolved in a vessel that had been kept warm at 25° C., and thus an underlayer solution was prepared.

| Underlayer solution (parts by mass) | |
|---|---|
| Propylene glycol monomethyl ether acetate | 67.8 |
| MEGAFAC RS-90 (manufactured by DIC Corporation) | 31.7 |
| IRGACURE 819 (manufactured by BASF SE) | 0.5 |

The underlayer solution prepared as described above was applied on a transparent PET (polyethylene terephthalate, manufactured by Toyobo Co., Ltd., COSMOSHINE A4100) substrate having a thickness of 100 μm using a bar coater at a coating amount of 3 mL/$m^2$. Subsequently, the substrate was heated so as to obtain a film surface temperature of 90° C., and the solution was dried for 120 seconds. Then, the underlayer solution was irradiated with ultraviolet radiation at a dose of 700 mJ/$cm^2$ using an ultraviolet irradiation apparatus in an atmosphere purged with nitrogen at an oxygen concentration of 100 ppm or less, and a crosslinking reaction was carried out. Thus, an underlayer was produced.

The haze value of the PET substrate was measured, and the haze value was 1%.

(Formation of Cholesteric Liquid Crystal Dots)

A composition as described below was stirred and dissolved in a vessel that had been kept warm at 25° C., and thus a cholesteric liquid crystal ink solution Gm (liquid crystal composition) was prepared.

| Cholesteric liquid crystal ink solution Gm (parts by mass) | |
|---|---|
| Methoxyethyl acrylate | 145.0 |
| Mixture of rod-like liquid crystal compounds as described below | 100.0 |
| IRGACURE 819 (manufactured by BASF SE) | 10.0 |
| Chiral agent A having the following structure | 5.78 |
| Surfactant having the following structure | 0.08 |

Rod-Like Liquid Crystal Compounds

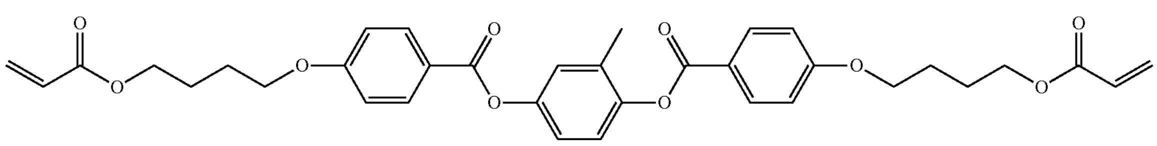

84%

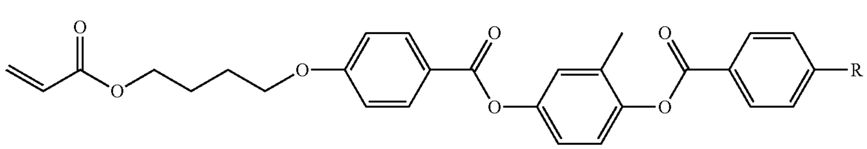

14%

-continued

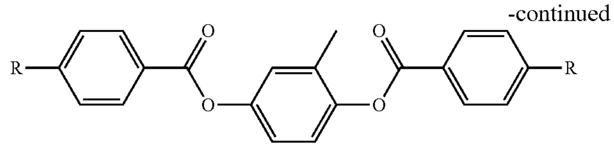

2%

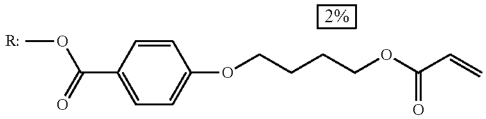

The values are expressed in % by mass. R represents a group that is bonded to an oxygen atom.

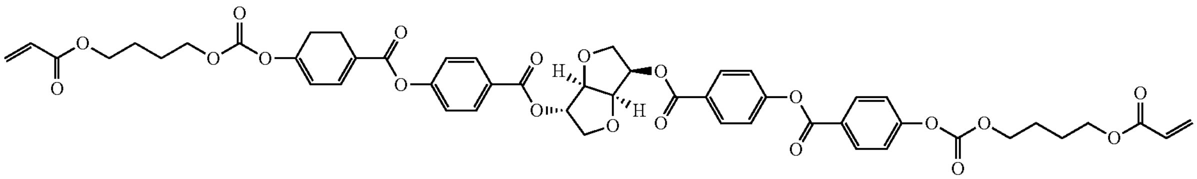

Chiral agent A

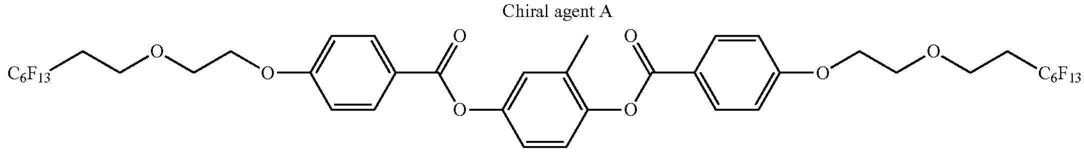

Surfactant

The cholesteric liquid crystal ink solution Gm is a material that forms dots capable of reflecting light having a center wavelength of 550 nm. The cholesteric liquid crystal ink solution Gm is a material that forms dots capable of reflecting right-handed circularly polarized light. That is, the cholesteric liquid crystal ink solution Gm is a material for forming right-handed polarizing green dots.

The cholesteric liquid crystal ink solution Gm prepared as described above was applied as droplets on the underlayer on the PET produced as described above with an inkjet printer (DMP-2831, manufactured by Fujifilm Dimatix, Inc.) over the entire surface of a region having a size of 100 mm×100 mm at a distance between dot centers (pitch) of 80 μm, and the ink solution was dried for 30 seconds at 95° C. Subsequently, the ink solution was irradiated with ultraviolet radiation at a dose of 500 mJ/cm$^2$ at room temperature using an ultraviolet irradiation apparatus, and was thereby cured to form dots. Thus, a transparent screen was obtained.

(Evaluation of Dot Shape and Cholesteric Structure)

Ten dots were randomly selected from among the dots of the transparent screen obtained as described above, and the shape of the dots was observed with a laser microscope (manufactured by Keyence Corporation). The dots had an average diameter of 23 μm and an average maximum height of 10 μm, and the angle formed at a contacting portion of both the dot surface at the dot edge and the underlayer surface (contact angle) was 83 degrees on the average. The height increased continuously in a direction extending from the dot edge toward the center.

One dot positioned at the center of the transparent screen obtained as described above was cut perpendicularly to the PET substrate at a plane including the dot center, and the cross-section was observed with a scanning electron microscope. As a result, a cross-sectional view in which a striped pattern of bright parts and dark parts could be recognized inside the dot was obtained.

From the cross-sectional view, the angle formed by the direction of the normal line to a line that was formed by the first dark line as counted from the surface on the air interface side of the dot and the surface on the air interface side, was measured, and the angles at the dot edge, between the dot edge and the center, and at the dot center were 90 degrees, 89 degrees, and 90 degrees, respectively. The angle formed by the direction of the normal line to a line that was formed by a dark line and the direction of the normal line to the PET substrate, decreased continuously from 84 degrees, 38 degrees, to 0 degrees in the order of positions at the dot edge, between the dot edge and the center, and at the dot center, respectively.

(Dot Area Ratio)

Ten dots were randomly selected from among the dots of the transparent screen obtained as described above, and the shape of the dots was observed with a laser microscope (manufactured by Keyence Corporation). The area ratio was measured at 5 sites of regions having a size of 1 mm×1 mm, and the average value of the area ratio was 6.5%.

(Formation of Overcoat Layer)

A composition as described below was stirred and dissolved in a vessel that had been kept warm at 25° C., and thus a coating liquid for an overcoat layer 1 was prepared.

| Coating liquid for an overcoat layer 1 (parts by mass) | |
|---|---|
| Acetone | 100.0 |
| KAYARAD DPCA-30 (manufactured by Nippon Kayaku Co., Ltd.) | 30.0 |

-continued

| Coating liquid for an overcoat layer 1 (parts by mass) | |
|---|---|
| EA-200 (manufactured by Osaka Gas Chemicals Co., Ltd.) | 70.0 |
| IRGACURE 819 (manufactured by BASF SE) | 3.0 |

The coating liquid for an overcoat layer 1 prepared as described above was applied on the underlayer on which cholesteric liquid crystal dots had been formed, using a bar coater at a coating amount of 40 mL/m$^2$. Subsequently, the substrate was heated so as to obtain a film surface temperature of 50° C., and the coating liquid was dried for 60 seconds. Then, the coating liquid was irradiated with ultraviolet radiation at a dose of 500 mJ/cm$^2$ using an ultraviolet irradiation apparatus, and a crosslinking reaction was carried out to produce an overcoat layer. Thus, a transparent screen as illustrated in FIG. 1B was obtained.

The refractive index of the dot was 1.58, the refractive index of the overcoat layer was 1.58, and the difference in the refractive index was 0.

Example 2

A transparent screen as illustrated in FIG. 3 was produced in the same manner as in Example 1, except that the transparent screen was configured to include three kinds of dots that reflect light in the wavelength regions different from each other.

Specifically, a transparent screen was produced by forming three kinds of dots using the cholesteric liquid crystal ink solution Gm, and a cholesteric liquid crystal ink solution Rm and a cholesteric liquid crystal ink solution Bm that will be described below, so as to be arranged in the sequence illustrated in FIG. 4A.

A cholesteric liquid crystal ink solution Rm was prepared in the same manner as in the case of the cholesteric liquid crystal ink solution Gin, except that the amount of addition of the chiral agent A was changed to 4.66 parts by mass. A cholesteric liquid crystal ink solution Bm was prepared in the same manner as in the case of the cholesteric liquid crystal ink solution Gin, except that the amount of addition of the chiral agent A was changed to 7.61 parts by mass.

The cholesteric liquid crystal ink solution Rm is a material for forming right-handed polarizing red dots that reflect right-handed circularly polarized light having a center wavelength of 650 nm, and the cholesteric liquid crystal ink solution Bin is a material for forming right-handed polarizing blue dots that reflect right-handed circularly polarized light having a center wavelength of 450 nm.

The angle formed by the direction of the normal line to a line that was formed by the first dark line as counted from the surface on the air interface side of each dot of the transparent screen thus produced and the surface on the air interface side was measured in the same manner as in Example 1, and in all cases, the angles were 88 degrees, 89 degrees, and 90 degrees at the dot edge, between the dot edge and the center, and at the dot center, respectively.

Example 3

A transparent screen as illustrated in FIG. 5 was produced in the same manner as in Example 1, except that the transparent screen was configured to include right-handed polarizing green dots that reflect right-handed circularly polarized light and left-handed polarizing green dots that reflect left-handed circularly polarized light.

Specifically, a transparent screen was produced by forming two kinds of dots using the cholesteric liquid crystal ink solution Gm and a cholesteric liquid crystal ink solution Gh that will be described below, so as to be arranged alternatingly.

A cholesteric liquid crystal ink solution Gh was prepared in the same manner as in the case of the cholesteric liquid crystal ink solution Gm, except that the chiral agent was changed to a chiral agent B that will be described below.

The cholesteric liquid crystal ink solution Gh is a material for forming left-handed polarizing green dots that reflect left-handed circularly polarized light having a center wavelength of 550 nm.

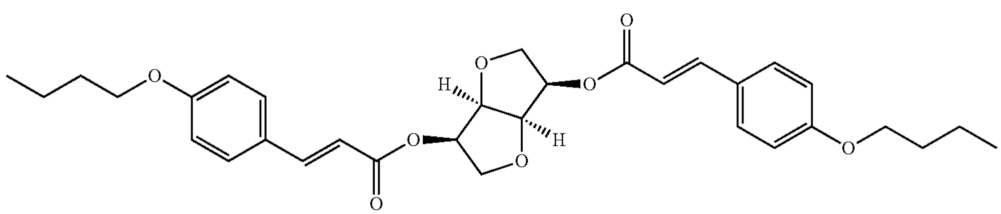

Chiral agent B

The angle formed by the direction of the normal line to a line that was formed by the first dark line as counted from the surface on the air interface side of each dot of the transparent screen thus produced and the surface on the air interface side was measured in the same manner as in Example 1, and in all cases, the angles were 89 degrees, 90 degrees, and 90 degrees at the dot edge, between the dot edge and the center, and at the dot center, respectively.

Example 4

A transparent screen as illustrated in FIG. 6 was produced in the same manner as in Example 1, except that the transparent screen was configured to reflect light in three wavelength regions different from each other, and to have dots that reflected right-handed circularly polarized light and dots that reflected left-handed circularly polarized light as the dots reflecting the light in various wavelength regions.

Specifically, a transparent screen was produced by forming six kinds of dots using the cholesteric liquid crystal ink solution Gm, the cholesteric liquid crystal ink solution Gh, the cholesteric liquid crystal ink solution Rm, the cholesteric liquid crystal ink solution Bm, and a cholesteric liquid crystal ink solution Rh and a cholesteric liquid crystal ink solution Bh that will be described below, so as to be arranged in sequence.

A cholesteric liquid crystal ink solution Rh was prepared in the same manner as in the case of the cholesteric liquid crystal ink solution Gh, except that the amount of addition of the chiral agent B was changed to 4.66 parts by mass. Also, a cholesteric liquid crystal ink solution Bh was prepared in the same manner as in the case of the cholesteric liquid crystal ink solution Gh, except that the amount of addition of the chiral agent B was changed to 7.61 parts by mass.

The cholesteric liquid crystal ink solution Rh is a material for forming left-handed polarizing red dots that reflect left-handed circularly polarized light having a center wavelength of 650 nm, and the cholesteric liquid crystal ink solution Bh is a material for forming left-handed polarizing blue dots that reflect left-handed circularly polarized light having a center wavelength of 450 nm.

The angle formed by the direction of the normal line to a line that was formed by the first dark line as counted from the surface on the air interface side of each dot of the transparent screen thus produced and the surface on the air interface side was measured in the same manner as in Example 1, and in all cases, the angles were 89 degrees, 89 degrees, and 89 degrees at the dot edge, between the dot edge and the center, and at the dot center, respectively.

Example 5

A transparent screen as illustrated in FIG. 7 was produced in the same manner as in Example 1, except that the transparent screen was configured to include dots each having three regions capable of reflecting light in wavelength regions different from each other in a single dot.

Specifically, a transparent screen was produced by forming three-layered dots T as illustrated in FIG. 7, using the cholesteric liquid crystal ink solution Gm, the cholesteric liquid crystal ink solution Run, and the cholesteric liquid crystal ink solution Bm.

The angle formed by the direction of the normal line to a line that was formed by the first dark line as counted from the surface on the air interface side of each dot of the transparent screen thus produced and the surface on the air interface side was measured in the same manner as in Example 1, and in all cases, the angles were 90 degrees, 89 degrees, and 90 degrees at the dot edge, between the dot edge and the center, and at the dot center, respectively.

Example 6

A transparent screen as illustrated in FIG. 8 was produced in the same manner as in Example 1, except that the transparent screen was configured to include dots each having a region that reflected right-handed circularly polarized light and a region that reflected left-handed circularly polarized light in a single dot.

Specifically, a transparent screen was produced by forming two-layered dots as illustrated in FIG. 8, using the cholesteric liquid crystal ink solution Gm and the cholesteric liquid crystal ink solution Gh.

The angle formed by the direction of the normal line to a line that was formed by the first dark line as counted from the surface on the air interface side of each dot of the transparent screen thus produced and the surface on the air interface side was measured in the same manner as in Example 1, and in all cases, the angles were 89 degrees, 90 degrees, and 90 degrees at the dot edge, between the dot edge and the center, and at the dot center, respectively.

Example 7

A transparent screen as illustrated in FIG. 9 was produced in the same manner as in Example 1, except that the transparent screen was configured to include dots each having a region that reflected red light and left-handed circularly polarized light; a region that reflected red light and right-handed circularly polarized light; a region that reflected green light and left-handed circularly polarized light; a region that reflected green light and right-handed circularly polarized light; a region that reflected blue light and left-handed circularly polarized light; and a region that reflected blue light and right-handed circularly polarized light, in a single dot.

Specifically, a transparent screen was produced by forming six-layered dots as illustrated in FIG. 9, using the cholesteric liquid crystal ink solution Gm, the cholesteric liquid crystal ink solution Gh, the cholesteric liquid crystal ink solution Rm, the cholesteric liquid crystal ink solution Rh, the cholesteric liquid crystal ink solution Bm, and the cholesteric liquid crystal ink solution Bh.

The angle formed by the direction of the normal line to a line that was formed by the first dark line as counted from the surface on the air interface side of each dot of the transparent screen thus produced and the surface on the air interface side was measured in the same manner as in Example 1, and in all cases, the angles were 87 degrees, 88 degrees, and 90 degrees at the dot edge, between the dot edge and the center, and at the dot center, respectively.

Example 8

A transparent screen was produced in the same manner as in Example 2, except that the transparent screen did not have an overcoat layer.

Examples 9 and 10

Transparent screens were produced in the same manner as in Example 2, except that the composition ratios of the coating liquid for an overcoat layer were changed, the refractive indices of the overcoat layer were adjusted to 1.56 and 1.54, respectively, and the differences between the refractive index of the dot and the refractive index of the overcoat layer were adjusted to 0.02 and 0.04, respectively.

Examples 11 and 12

Transparent screens were produced in the same manner as in Example 2, except that the distances between dot centers (pitches) were adjusted to 50 μm and 150 μm, respectively.

For the various transparent screens, the area ratios of dots were measured as described above, and the area ratios of dots were 16.6% and 1.8%, respectively.

Example 13

A transparent screen was produced in the same manner as in Example 2, except that the underlayer solution was changed to an underlayer solution 2 that will be described below, and the contact angle between the dot and the substrate (underlayer) was changed to 43°.

| Underlayer solution 2 (parts by mass) | |
|---|---|
| Propylene glycol monomethyl ether acetate | 67.8 |
| Dipentaerythritol hexaacrylate (manufactured by Nippon Kayaku Co., Ltd., trade name: KAYARAD DPHA) | 30.7 |

-continued

| Underlayer solution 2 (parts by mass) | |
|---|---|
| Compound A having the following structure (manufactured by Wako Pure Chemical Industries, Ltd.) | 1.0 |
| IRGACURE 819 (manufactured by BASF SE) | 0.5 |

Compound A

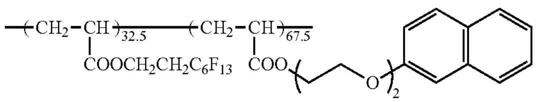

Example 14

A transparent screen was produced in the same manner as in Example 2, except that a PET (manufactured by Teijin Co., Ltd., TEIJIN TETORON FILM (SL type), film thickness 38) μm) substrate was used as the substrate.

The haze value of this substrate was measured, and the haze value was 3%.

Example 15

A transparent screen was produced in the same manner as in Example 2, except that an AG (antiglare) substrate was used as the substrate. The AG substrate was produced by making reference to the Examples ([0088] to [0096]) of JP2012-78540A. The haze value of this substrate was measured, and the haze value was 20%.

Example 17

(Production of Underlayer)

A composition as described below was stirred and dissolved in a vessel that had been kept warm at 25° C., and thus an underlayer solution 3 was prepared.

| Underlayer solution 3 (parts by mass) | |
|---|---|
| Rod-like liquid crystal compounds as described below | 100.0 |
| IRGACURE 819 (manufactured by BASF SE) | 3.0 |
| Compound A as described below | 0.6 |
| Methyl ethyl ketone | 932.4 |

Rod-like liquid crystal compounds

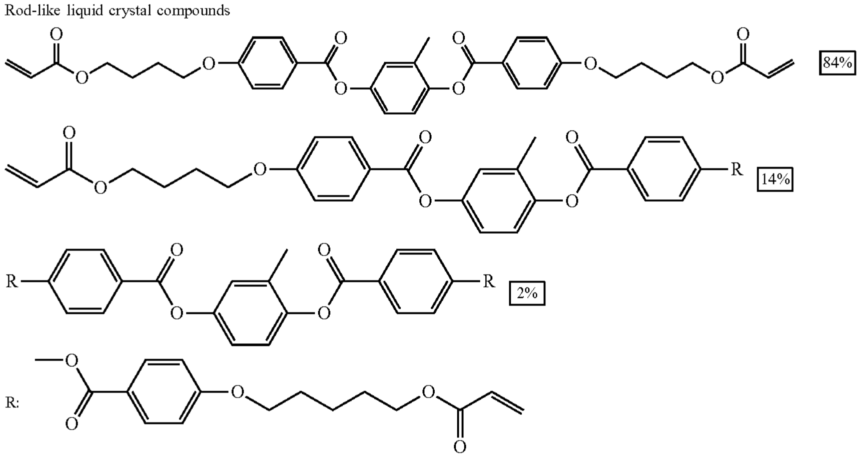

The values are expressed in % by mass. R represents a group that is bonded an oxygen atom.

Compound A

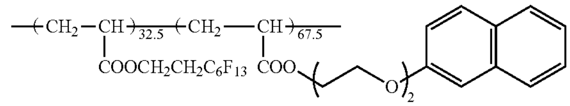

The underlayer solution 3 prepared as described above was applied on a transparent PET (polyethylene terephthalate, manufactured by Toyobo Co., Ltd., COSMOSHINE A4100) substrate having a thickness of 75 μm, which had been subjected to a rubbing treatment in the longitudinal direction, using a #2.6 bar coater. Subsequently, the substrate was heated so as to obtain a film surface temperature of 50° C., and the solution was dried for 60 seconds. Then, the solution was irradiated with ultraviolet radiation at a dose of 500 mJ/cm$^2$ using an ultraviolet irradiation apparatus in an atmosphere that had been purged with nitrogen at an oxygen concentration of 100 ppm or less, a crosslinking reaction was carried out, and thus an underlayer was produced.

The haze value of the PET substrate was measured, and the haze value was 0.8%.

(Formation of Cholesteric Liquid Crystal Dots)

A composition as described below was stirred and dissolved in a vessel that had been kept warm at 25° C., and a cholesteric liquid crystal ink solution Gm2 (liquid crystal composition) was prepared.

| Cholesteric liquid crystal ink solution Gm2 (parts by mass) | |
|---|---|
| Cyclopentanone | 139.6 |
| Mixture of rod-like liquid crystal compounds as described below | 100.0 |
| IRGACURE 907 (manufactured by BASF SE) | 3.0 |
| KAYACURE-DETX (manufactured by Nippon Kayaku Co., Ltd.) | 1.0 |
| Chiral agent A having the following structure | 5.63 |
| Surfactant having the following structure | 0.08 |

Rod-like liquid crystal compounds

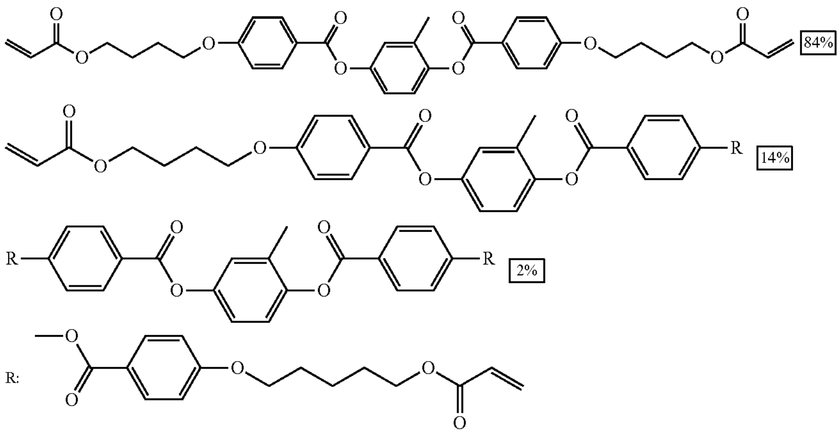

The values are expressed in % by mass. R represents a group that is bonded to an oxygen atom.

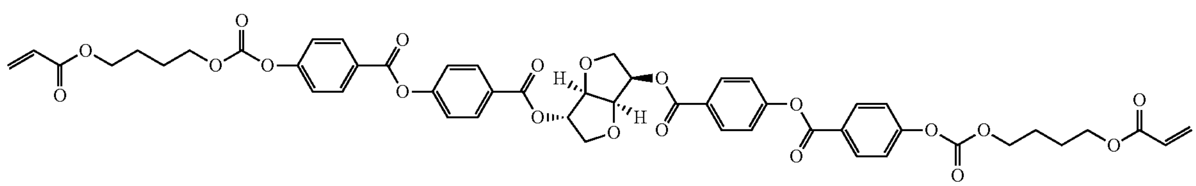

Chiral agent A

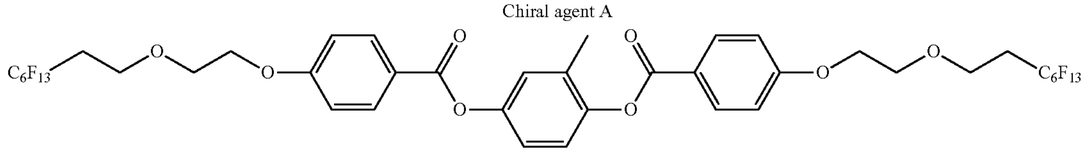

Surfactant

The cholesteric liquid crystal ink solution Gm2 is a material that forms dots capable of reflecting light having a center wavelength of 550 nm. The cholesteric liquid crystal ink solution Gm2 is a material that forms dots capable of reflecting right-handed circularly polarized light. That is, the cholesteric liquid crystal ink solution Gm2 is a material for forming right-handed polarizing green dots.

The cholesteric liquid crystal ink solution Gm2 prepared as described above was applied as droplets on the underlayer on the PET substrate produced as described above, using an inkjet printer (DMP-2831, manufactured by Fujifilm Dimatix, Inc.) over the entire surface of a region having a size of 100 mm×100 mm at a distance between dot centers (pitches) of 50 μm, and the ink solution was dried for 30 seconds or longer at 40° C. Subsequently, the ink solution was cured by irradiating the ink solution with ultraviolet radiation at a dose of 500 mJ/cm$^2$ at room temperature using an ultraviolet irradiation apparatus, and dots were formed. Thus, a transparent member was obtained.

(Evaluation of Dot Shape and Cholesteric Structure)

Ten dots were randomly selected from among the dots of the transparent member obtained as described above, and the shape of the dots was observed with a laser microscope (manufactured by Keyence Corporation). The dots had an average diameter of 23 μm and an average maximum height of 5 μm, and the angle formed at a contacting portion of both the dot surface at the dot edge and the underlayer surface (contact angle) was 43 degrees on the average. The height increased continuously in a direction extending from the dot edge toward the center.

Figure 11:
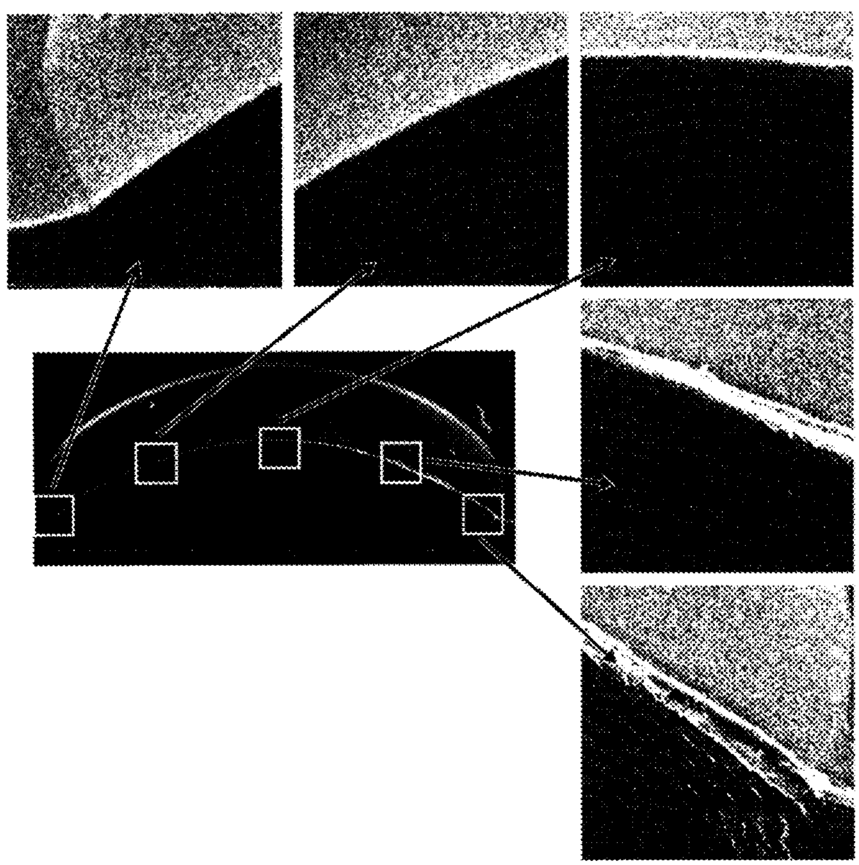
FIG. 11 is a view illustrating an image obtained by observing, by scanning electron microscope (SEM), a cross-section of the dots of a transparent screen manufactured in an Example.

One dot positioned at the center of the transparent screen obtained as described above was cut perpendicularly to the PET substrate at a plane including the dot center, and the cross-section was observed with a scanning electron microscope. As a result, a striped pattern of bright parts and dark parts could be recognized inside the dot; and a cross-sectional view as illustrated in FIG. 11 was obtained (the site on the outer side of the hemispherical shape on the right-hand side of the cross-sectional view is a burr created at the time of cutting).

From the cross-sectional view, the angle formed by the direction of the normal line to a line that was formed by the first dark line as counted from the surface on the air interface side of the dot and the surface on the air interface side, was measured, and the angles at the dot edge, between the dot edge and the center, and at the dot center were 90 degrees, 89 degrees, and 90 degrees, respectively. The angle formed by the direction of the normal line to a line that was formed by a dark line and the direction of the normal line to the PET substrate, decreased continuously from 43 degrees, 25 degrees, to 0 degrees in the order of positions at the dot edge, between the dot edge and the center, and at the dot center, respectively.

(Dot Area Ratio)

Ten dots were randomly selected from among the dots of the transparent member obtained as described above, and the shape of the dots was observed with a laser microscope (manufactured by Keyence Corporation). The area ratio was measured at five sites in a region having a size of 1 mm×1 mm, and the average value of the area ratio was 50%.

(Formation of Overcoat Layer)

A composition as described below was stirred and dissolved in a vessel that had been kept warm at 25° C., and a coating liquid for an overcoat layer 2 was prepared.

| Coating liquid for an overcoat layer 2 (parts by mass) | |
|---|---|
| Acetone | 103.6 |
| KAYARAD DPCA-30 (manufactured by Nippon Kayaku Co., Ltd.) | 60.0 |
| Compound L as described below | 40.0 |
| Compound A as described below | 0.6 |
| IRGACURE 127 (manufactured bby BASF SE) | 3.0 |

Compound L

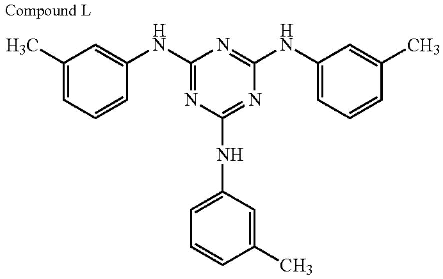

Compound A

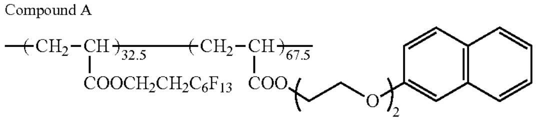

The coating liquid for an overcoat layer 2 prepared as described above was applied on the underlayer on which the cholesteric liquid crystal dots had been formed, using a #8 bar coater. Subsequently, the substrate was heated so as to obtain a film surface temperature of 50° C., and the coating liquid was dried for 60 seconds. Then, the coating liquid was irradiated with ultraviolet radiation at a dose of 500 mJ/cm$^2$ using an ultraviolet irradiation apparatus, a crosslinking reaction was carried out, and thus an overcoat layer was produced. Thus, a transparent member G as illustrated in FIG. 1B was obtained.

The refractive index of the dots was 1.58, the refractive index of the overcoat layer was 1.58, and the difference in the refractive index was 0.

A cholesteric liquid crystal ink solution Rm2 was prepared in the same manner as in the case of the cholesteric liquid crystal ink solution Gm2, except that the amount of addition of the chiral agent A was changed to 4.70 parts by mass. A cholesteric liquid crystal ink solution Bm2 was prepared in the same manner as in the case of the cholesteric liquid crystal ink solution Gm2, except that the amount of addition of the chiral agent A was changed to 7.02 parts by mass.

The cholesteric liquid crystal ink solution Rm2 is a material for forming right-handed polarizing red dots that reflect right-handed circularly polarized light having a center wavelength of 650 nm, and the cholesteric liquid crystal ink solution Bm2 is a material for forming right-handed polarizing blue dots that reflect right-handed circularly polarized light having a center wavelength of 450 nm.

A transparent member R was obtained in a similar way, except that Rm2 was used instead of Gm2. Furthermore, a transparent member B was obtained in a similar way, except that Bm2 was used instead of Gm2. Next, the overcoat side of the transparent member R and the PET substrate side of the transparent member G were bonded using a pressure-sensitive adhesive ("SK-2057" manufactured by Soken Chemical & Engineering Co., Ltd.). Furthermore, the overcoat side of the transparent member G and the PET substrate side of the transparent member B were bonded using the same pressure-sensitive adhesive, and thus a transparent screen of Example 17 as illustrated in FIG. 13 was obtained. At that time, the members were bonded such that the dots of the various layers would not be superposed when viewed from the front surface direction.

Example 18

A transparent screen of Example 18 was obtained in the same manner as in Example 17, except that the overcoat side of the transparent member B and the PET substrate side of the transparent member G were bonded using a pressure-sensitive adhesive, and the overcoat side of the transparent member G and the PET substrate side of the transparent member R were bonded using a pressure-sensitive adhesive.

Example 19

(Production of Pressure-Sensitive Adhesive)

A composition as described below was stirred and dissolved in a vessel that had been kept warm at 25° C., and a pressure-sensitive adhesive coating liquid was prepared.

| Pressure-sensitive adhesive coating liquid (parts by mass) | |
|---|---|
| Toluene | 2.5 |
| Methyl ethyl ketone | 2.5 |
| Acrylic pressure-sensitive adhesive (SK-DYNE 2094; manufactured by Soken Chemical & Engineering Co., Ltd.) | 100.0 |
| Refractive index adjusting agent (OGSOL EA0200; manufactured by Osaka Gas Chemicals Co., Ltd.) | 100.0 |
| Isocyanate-based curing agent (TD75; manufactured by Soken Chemical Engineering Co., Ltd.) | 0.4 |

An underlayer was formed on the PET substrate in the same manner as in Example 17, and dots were formed using the cholesteric liquid crystal ink solution Rm2. The pressure-sensitive adhesive coating liquid was further applied with an applicator on the dot-formed surface, and the coating liquid was dried. Next, the PET base material surface of the underlayer-attached PET base material on which dots had been formed using the cholesteric liquid crystal ink solution Gm2 was bonded to the pressure-sensitive adhesive surface. The pressure-sensitive adhesive coating liquid was further applied on the dot-formed surface formed with the cholesteric liquid crystal ink solution Gm2, and the coating liquid was dried. Next, the PET base material surface of the underlayer-attached PET base material on which dots had been formed using the cholesteric liquid crystal ink solution Bm2 was bonded to the pressure-sensitive adhesive surface. Furthermore, the pressure-sensitive adhesive coating liquid was applied on the dot-formed surface formed with the cholesteric liquid crystal ink solution Bm2, and the coating liquid was dried. A known antireflective function-imparted glass plate was further bonded thereon, and thus a transparent screen of Example 19 as illustrated in FIG. 14 was obtained.

Example 20

An underlayer was formed on a PET substrate in the same manner as in Example 17, and dots were formed using the cholesteric liquid crystal ink solution Rm2. The pressure-sensitive adhesive coating liquid was further applied on the dot-formed surface, and the coating liquid was dried.

Separately, an underlayer was formed on either surface of a PET substrate in the same manner as in Example 17. Dots were forming on the underlayer of one side using the cholesteric liquid crystal ink Gm2, and dots were formed on the underlayer of the other side using the cholesteric liquid crystal ink Bm2. Next, the pressure-sensitive adhesive applied on the dot-formed surface formed with the cholesteric liquid crystal ink Rm2 was bonded to the dot-formed surface formed with the cholesteric liquid crystal ink Gm2.

Furthermore, the pressure-sensitive adhesive coating liquid was applied on the dot-formed surface formed with the cholesteric liquid crystal ink Bm2, and the coating liquid was applied. An antireflective function-imparted glass plate was further bonded thereto, and thus a transparent screen of Example 20 as illustrated in FIG. 15 was obtained.

Comparative Example 1

A transparent screen was produced by applying a coating liquid containing beads (XX-151S; perfectly spherical particles of a crosslinked polymethyl methacrylate-styrene copolymer, manufactured by Sekisui Chemical Co., Ltd.) having an average particle size of 10 μm in a mixed solvent of MIBK (methyl isobutyl ketone) and MEK (methyl ethyl ketone) as a reflective material, on a transparent PET (polyethylene terephthalate, manufactured by Toyobo Co., Ltd., COSMOSHINE A4100) substrate having a thickness of 100 μm.

<Evaluation>

For the transparent screens of Examples and Comparative Examples thus produced, transparency, front surface brightness, and viewing angle characteristics were evaluated.

(Evaluation of Transparency)

Regarding the evaluation of transparency, transmittance was measured using a haze meter (manufactured by Nippon Denshoku Industries Co., Ltd.), and transparency was evaluated according to the following criteria.

AA: Transmittance is 85% or higher.

A: Transmittance is 80% or higher and lower than 85%.

B: Transmittance is 75% or higher and lower than 80%.

C: Transmittance is 70% or higher and lower than 75%.

D: Transmittance is 65% or higher and lower than 70%.

E: Transmittance is 60% or higher and lower than 65%.

(Evaluation of Haze)

Regarding the evaluation of haze, the haze was measured using a haze meter (manufactured by Nippon Denshoku Industries Co., Ltd.), and was evaluated according to the following criteria.

A: Haze is less than 4%.

B: Haze is 4% or more and less than 10%.

C: Haze is 10% or more and less than 25%.

D: Haze is 25% or more.

(Evaluation of Front Surface Brightness)

Figure 12:
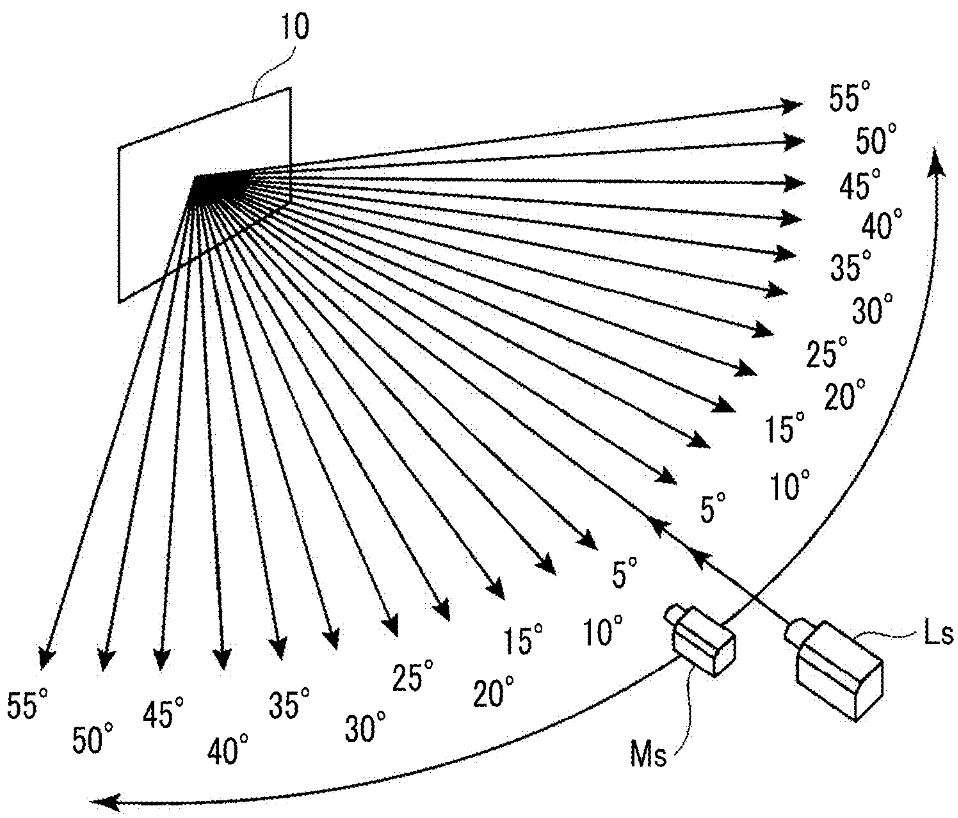
FIG. 12 is a schematic perspective view for explaining a method for measuring a viewing angle.

Regarding the evaluation of the front surface brightness, a transparent screen was placed in a conventional office environment, and as illustrated in FIG. 12, a white light source Ls (EMP-7900 manufactured by Seiko Epson Corporation) was disposed at a position 1.0 m away in front of the transparent screen, that is, in the normal line direction passing through the center of the transparent screen. The screen was irradiated with white light, and brightness was measured with a brightness meter Ms (brightness colorimeter BM-5A manufactured by Topcon Technohouse Corporation) disposed at a position 1.5 m away in the normal line direction passing through the center of the transparent screen. The relative value of the brightness with respect to Comparative Example 1 was determined and was evaluated according to the following criteria.

A: Brightness is higher than 2.0.

B: Brightness is higher than 1.1 and 2.0 or lower.

C: Brightness is higher than 1.0 and 1.1 or lower.

D: Brightness is 1.0 or lower.

(Evaluation of Viewing Angle Characteristics)

Regarding the evaluation of the viewing angle characteristics, in connection with the measurement of the front surface brightness, brightness was measured at various positions by sequentially changing the angle of disposition of the brightness meter Ms in the horizontal direction along the same arc with respect to the normal line direction of the transparent screen as a reference as illustrated in FIG. 12. Thus, the angle at which the brightness became half the front surface brightness (peak brightness) (half-value angle) was determined and evaluated according to the following criteria.

A: The half-value angle is 55° or larger.

B: The half-value angle is 45° or larger and smaller than 55°.

C: The half-value angle is 35° or larger and smaller than 45°.

D: The half-value angle is smaller than 35°.

The results are presented in Table 1.

In Table 1, under the item of the reflective material, a reflective material that used dots formed of a cholesteric liquid crystal material is indicated as "Ch". Regarding the item of juxtaposition disposition, the case in which three kinds of dots reflecting light in wavelength regions different from each other were provided is indicated as "RGB"; the case in which two kinds of dots respectively reflecting right-handed circularly polarized light and left-handed circularly polarized light were provided is indicated as "Right-left"; and the case in which six kinds of dots respectively reflecting light different from one another in terms of the wavelength region and the optical activity were provided is indicated as "Right-left RGB". Similarly, under the item of lamination, the case in which three layers of regions respectively reflecting light in wavelength regions different from one another were provided is indicated as "RGB"; the case in which two layers of regions respectively reflecting right-handed circularly polarized light and left-handed circularly polarized light were provided is indicated as "Right-left"; and the case in which six layers of regions reflecting light different from one another in terms of the wavelength region and the optical activity were provided is indicated as "Right-left RGB". Furthermore, under the item of bonding, the case in which layers were bonded in the order of B, G, and R as viewed from the side closer to the light source is indicated as "BGR"; the case in which layers were bonded in the order of R, G, and B as viewed from the side closer to the light source is indicated as "RGB"; and the case in which only the layer of G was formed on the back surface of the PET substrate is indicated as "BGreverseR".

Under the item of OC layer, the case in which an overcoat layer was provided is indicated as "Present"; and the case in which a pressure-sensitive adhesive layer was provided is indicated as "Pressure-sensitive adhesive layer".

Example 16

An evaluation of the front surface brightness was performed by disposing a λ/4 film between the transparent screen of Example 2 and the light source Ls, and thereby emitting the light from the light source as right-handed circularly polarized light. The λ/4 film was produced by making reference to the Examples ([0272] to [0282]) of JP2012-18396A.

The results are presented in Table 1.

TABLE 1

| | | | | COMPARATIVE EXAMPLE | EXAMPLE | | | | | | |
|---|---|---|---|---|---|---|---|---|---|---|---|
| | | | | 1 | 1 | 2 | 3 | 4 | 5 | 6 | 7 |
| Configuration | Substrate | Type | | PET | PET | PET | PET | PET | PET | PET | PET |
| | | Haze value | | — | 1% | 1% | 1% | 1% | 1% | 1% | 1% |
| | Reflective material | Type | | Beads | Ch | Ch | Ch | Ch | Ch | Ch | Ch |
| | | Selective reflection wavelength | 450 nm | — | — | 450 nm | — | 450 nm | 450 nm | — | 450 nm |
| | | | 550 nm | — | 550 nm | 550 nm | 550 nm | 550 nm | 550 nm | 550 nm | 550 nm |
| | | | 650 nm | — | — | 650 nm | — | 650 nm | 650 nm | — | 650 nm |
| | | Optical activity | | — | Right | Right | Left-Right | Left-Right | Right | Left-Right | Left-Right |
| | | Juxtaposition disposition | | — | — | RGB | Right-Left | Right-Left RGB | — | — | — |
| | | Lamination | | — | — | — | — | — | RGB | Right-Left | Right-Left RGB |
| | | Bonding | | — | — | — | — | — | — | — | — |
| | | Density | Dot interval | — | 80 μm | 80 μm | 80 μm | 80 μm | 80 μm | 80 μm | 80 μm |
| | | | Dot diameter | — | 23 μm | 23 μm | 23 μm | 23 μm | 23 μm | 23 μm | 23 μm |
| | | | Area ratio | — | 6.5% | 6.5% | 6.5% | 6.5% | 6.5% | 6.5% | 6.5% |
| | | Contact angle | | — | 83° | 83° | 83° | 83° | 83° | 83° | 83° |
| | OC layer | Present/absent | | Absent | Present | Present | Present | Present | Present | Present | Present |
| | | Difference in refractive index | | — | 0.00 | 0.00 | 0.00 | 0.00 | 0.00 | 0.00 | 0.00 |
| Light source | Polarization | | | — | — | — | — | — | — | — | — |
| Evaluation | Transparency | | | E | A | A | A | A | A | A | A |
| | Haze | | | D | A | A | A | A | A | A | A |
| | Front surface brightness | | | D | C | C | C | C | A | B | A |
| | Viewing angle characteristics | | | D | B | B | B | B | B | B | B |

| | | | | EXAMPLE | | | | | | |
|---|---|---|---|---|---|---|---|---|---|---|
| | | | | 8 | 9 | 10 | 11 | 12 | 13 | 14 |
| Configuration | Substrate | Type | | PET | PET | PET | PET | PET | PET | PET |
| | | Haze value | | 1% | 1% | 1% | 1% | 1% | 1% | 3% |
| | Reflective material | Type | | Ch | Ch | Ch | Ch | Ch | Ch | Ch |
| | | Selective reflection wavelength | 450 nm | 450 nm | 450 nm | 450 nm | 450 nm | 450 nm | 450 nm | 450 nm |
| | | | 550 nm | 550 nm | 550 nm | 550 nm | 550 nm | 550 nm | 550 nm | 550 nm |
| | | | 650 nm | 650 nm | 650 nm | 650 nm | 650 nm | 650 nm | 650 nm | 650 nm |
| | | Optical activity | | Right | Right | Right | Right | Right | Right | Right |
| | | Juxtaposition disposition | | RGB | RGB | RGB | RGB | RGB | RGB | RGB |
| | | Lamination | | — | — | — | — | — | — | — |
| | | Bonding | | — | — | — | — | — | — | — |
| | | Density | Dot interval | 80 μm | 80 μm | 80 μm | 50 μm | 150 μm | 80 μm | 80 μm |
| | | | Dot diameter | 23 μm | 23 μm | 23 μm | 23 μm | 23 μm | 23 μm | 23 μm |
| | | | Area ratio | 6.5% | 6.5% | 6.5% | 16.6% | 1.8% | 6.5% | 6.5% |
| | | Contact angle | | 83° | 83° | 83° | 83° | 83° | 43° | 83° |
| | OC layer | Present/absent | | Absent | Present | Present | Present | Present | Present | Present |
| | | Difference in refractive index | | — | 0.02 | 0.04 | 0.00 | 0.00 | 0.00 | 0.00 |
| Light source | Polarization | | | — | — | — | — | — | — | — |
| Evaluation | Transparency | | | C | B | C | B | A | A | C |
| | Haze | | | C | B | B | B | A | A | B |
| | Front surface brightness | | | A | B | B | A | D | B | B |
| | Viewing angle characteristics | | | A | B | B | B | B | C | B |

TABLE 1-continued

| | | | | EXAMPLE 15 | 16 | 17 | 18 | 19 | 20 |
|---|---|---|---|---|---|---|---|---|---|
| Configu-ration | Substrate | Type | | AG | PET | PET + underlayer | PET + underlayer | PET + underlayer | PET + underlayer |
| | | Haze value | | 20% | 1% | 0.8% | 0.8% | 0.8% | 0.8% |
| | Reflective material | Type | | Ch | Ch | Ch(m2) | Ch(m2) | Ch(m2) | Ch(m2) |
| | | Selective reflection wavelength | 450 nm | 450 nm | 450 nm | 450 nm | 450 nm | 450 nm | 450 nm |
| | | | 550 nm | 550 nm | 550 nm | 550 nm | 550 nm | 550 nm | 550 nm |
| | | | 650 nm | 650 nm | 650 nm | 650 nm | 650 nm | 650 nm | 650 nm |
| | | Optical activity | | Right | Right | Right | Right | Right | Right |
| | | Juxtaposition disposition | | RGB | RGB | — | — | — | — |
| | | Lamination | | — | — | — | — | — | — |
| | | Bonding | | — | — | BGR | RGB | BGR | BGreverseR |
| | | Density | Dot interval | 80 μm | 80 μm | 50 μm | 50 μm | 50 μm | 50 μm |
| | | | Dot diameter | 23 μm | 23 μm | 23 μm | 23 μm | 23 μm | 23 μm |
| | | | Are a ratio | 6.5% | 6.5% | 50% | 50% | 50% | 50% |
| | | Contact angle | | 83° | 83° | 43° | 43° | 43° | 43° |
| | OC layer | Present/absent | | Present | Present | Present | Present | Pressure-sensitive adhesive layer | Pressure-sensitive adhesive layer |
| | | Difference in refractive index | | 0.00 | 0.00 | 0.00 | 0.00 | 0.03 | 0.03 |
| Light source | Polarization | | | — | Right | — | — | — | — |
| Evaluation | Transparency | | | D | A | C | C | C | C |
| | Haze | | | C | A | B | B | C | C |
| | Front surface brightness | | | A | B | A | B | A | A |
| | Viewing angle characteristics | | | A | B | A | B | A | A |

As shown in Table 1, it can be seen that Examples 1 to 20, which are transparent screens of the invention, can increase both transparency and viewing angle characteristics compared to Comparative Example 1.

From a comparison between Examples 2 to 4 and Examples 5 to 7, it can be seen that when a configuration having two or more regions that reflect light in different wavelength regions in a single dot, or a configuration having a region that reflects right-handed circularly polarized light and a region that reflects left-handed circularly polarized light, is adopted, the front surface brightness can be further increased.

From a comparison between Example 2 and Example 8, it can be seen that transparency can be enhanced by providing an overcoat layer.

From a comparison between Example 2, 9, and 10, it can be seen that transparency becomes higher as the difference between the refractive index of the overcoat layer and the refractive index of the dots is smaller.

From a comparison between Examples 2, 11, and 12, it can be seen that an area ratio of dots of 6.5% or higher is preferred.

From a comparison between Examples 2 and 13, it can be seen that when the contact angle between the dot and the substrate is 60° or larger, the viewing angle characteristics are further enhanced, and it is preferable.

From a comparison between Examples 2, 14, and 15, it can be seen that transparency is enhanced as the haze value of the substrate is smaller, and it is preferable.

From a comparison between Example 2 and Example 16, it can be seen that when the polarization direction of the light emitted from a light source coincides with the polarization direction of the light reflected by the dot, the front surface brightness increases, and it is preferable.

From a comparison between Example 17 and Example 18, it can be seen that in a case in which a plurality of members having dots formed on a substrate are laminated, it is preferable to laminate the members in the order of a member having dots that reflect blue light, a member having dots that reflect green light, and a member having dots that reflect red light, as viewed from the light incidence side.

From the above-described results, the effects of the invention are obvious.

EXPLANATION OF REFERENCES

10*a* to 10*i*: transparent screen
12: substrate
14: support
16: overcoat layer
18: underlayer
20: dot
20R: red dot
20G: green dot
20B: blue dot
20*m*: right-handed polarizing dot
20*h*: left-handed polarizing dot
20Rm: right-handed polarizing red dot
20Rh: left-handed polarizing red dot
20Gm: right-handed polarizing green dot
20Gh: left-handed polarizing green dot
20Bm: right-handed polarizing blue dot
20Bh: left-handed polarizing blue dot
20T: three-layered dot
20W: two-layered dot
20S: six-layered dot
21R: red region
21G: green region
21B: blue region
21*m*: right-handed polarizing region
21*h*: left-handed polarizing region
21Rm: right-handed polarizing red region
21Rh: left-handed polarizing red region
21Gm: right-handed polarizing green region
21Gh: left-handed polarizing green region
21Bm: right-handed polarizing blue region 21Bh: left-handed polarizing blue region
30: pressure-sensitive adhesive layer
32: transparent substrate

What is claimed is:

1. A transparent screen comprising:
a substrate capable of transmitting light; and
a plurality of dots formed on a surface of the substrate, each of the dots having wavelength-selective reflectivity and being formed of a liquid crystal material having a cholesteric structure,
wherein the cholesteric structure gives a striped pattern of bright parts and dark parts in a cross-sectional view of the dot observed by scanning electron microscope,
the dot includes a portion having a height that increases continuously to the maximum height in a direction extending from the edge toward the center of the dot, and
for all points at the portion, the angle formed by the normal line to a line that is formed by a first one of the dark parts as counted from the surface of the dot on the opposite side of the substrate and the surface of the dot is in the range of 70° to 90°.

2. The transparent screen according to claim 1, further comprising an overcoat layer covering the dots on the surface of the substrate on the side where the dots have been formed,
wherein the difference between the refractive index of the overcoat layer and the refractive index of the dots is 0.10 or less.

3. The transparent screen according to claim 2, wherein the area ratio of the dots with respect to the substrate as viewed in the direction of the normal line to a principal surface of the substrate is 1.0% to 90.6%.

4. The transparent screen according to claim 3, wherein the plurality of dots include dots that reflect right-handed circularly polarized light and dots that reflect left-handed circularly polarized light.

5. The transparent screen according to claim 4, which includes dots each having, in a single dot, a region that reflects right-handed circularly polarized light and a region that reflects left-handed circularly polarized light.

6. The transparent screen according to claim 5, wherein the plurality of dots include two or more kinds of dots that reflect light in wavelength regions different from each other.

7. The transparent screen according to claim 6, which includes dots each having, in a single dot, two or more regions that reflect light in wavelength regions different from each other.

8. The transparent screen according to claim 7, wherein the contact angle between the dot and the substrate is 40° or larger.

9. The transparent screen according to claim 8, wherein the liquid crystal material is a material obtainable by curing a liquid crystal composition including a liquid crystal compound, a chiral agent, and a surfactant.

10. The transparent screen according to claim 9, wherein the haze value of the substrate is 0.1% to 30.0%.

11. The transparent screen according to claim 1, wherein the area ratio of the dots with respect to the substrate as viewed in the direction of the normal line to a principal surface of the substrate is 1.0% to 90.6%.

12. The transparent screen according to claim 1, wherein the plurality of dots include dots that reflect right-handed circularly polarized light and dots that reflect left-handed circularly polarized light.

13. The transparent screen according to claim 1, which includes dots each having, in a single dot, a region that reflects right-handed circularly polarized light and a region that reflects left-handed circularly polarized light.

14. The transparent screen according to claim 1, wherein the plurality of dots include two or more kinds of dots that reflect light in wavelength regions different from each other.

15. The transparent screen according to claim 1, which includes dots each having, in a single dot, two or more regions that reflect light in wavelength regions different from each other.

16. The transparent screen according to claim 1, wherein the contact angle between the dot and the substrate is 40° or larger.

17. The transparent screen according to claim 1, wherein the liquid crystal material is a material obtainable by curing a liquid crystal composition including a liquid crystal compound, a chiral agent, and a surfactant.

18. The transparent screen according to claim 1, wherein the haze value of the substrate is 0.1% to 30.0%.

19. The transparent screen according to claim 1, wherein a contact angle between the substrate and the dot is 40° or larger.

20. The transparent screen according to claim 1, wherein for the all points at the portion, an angle formed by the normal line to any line that is formed by from a second to 20th dark part as counted from the surface of the dot on the opposite side of the substrate and the surface of the dot is in the range of 70° to 90°.

* * * * *